United States Patent
Guibene et al.

(10) Patent No.: US 11,153,414 B2
(45) Date of Patent: Oct. 19, 2021

(54) LOW POWER WIDE AREA INTERNET PROTOCOL COMMUNICATION

(71) Applicant: Intel Corporation, Santa Clara, CA (US)

(72) Inventors: Wael Guibene, Dublin (IE); Mark Kelly, Lucan (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/317,000

(22) PCT Filed: Aug. 12, 2016

(86) PCT No.: PCT/US2016/046651
§ 371 (c)(1),
(2) Date: Jan. 10, 2019

(87) PCT Pub. No.: WO2018/031026
PCT Pub. Date: Feb. 15, 2018

(65) Prior Publication Data
US 2019/0238662 A1    Aug. 1, 2019

(51) Int. Cl.
*H04L 29/06* (2006.01)
*H04L 29/08* (2006.01)
(Continued)

(52) U.S. Cl.
CPC .............. *H04L 69/08* (2013.01); *H04L 29/06* (2013.01); *H04L 29/08* (2013.01); *H04L 67/12* (2013.01);
(Continued)

(58) Field of Classification Search
CPC ....... H04L 29/06; H04L 29/08; H04L 45/025; H04L 67/12; H04L 69/08; H04L 69/168;
(Continued)

(56) References Cited

U.S. PATENT DOCUMENTS 5,918,022 A * 6/1999 Batz ................... H04L 12/2854
370/401
7,916,725 B2    3/2011 Serna et al.
(Continued)

FOREIGN PATENT DOCUMENTS

WO    2015114685 A1    8/2015

OTHER PUBLICATIONS

Apoorve, "What is the difference between microprocessor and microcontroller," CircuitDigest, http://circuitdigest.com/article/what-is-the-difference-between-microprocessor-and-microcontroller via Archive.org captured May 24, 2016, published Jun. 2, 2015, pp. 1-5 (Year: 2015).*
(Continued)

*Primary Examiner* — Thomas R Cairns
(74) *Attorney, Agent, or Firm* — Alliance IP, LLC

(57) ABSTRACT

A device includes a microcontroller and communications logic to identify data to be sent to another device and encapsulate the data in a data link layer frame of a wireless data link layer protocol. The data link layer frame includes a particular field and the particular field encapsulates Internet Protocol (IP) packet data, and the data is encapsulated in the IP packet data. The device further includes a transmitter to send the data to the other device over a one-hop radio link according to a low power wide area (LPWA) protocol, and the data link layer frame is sent in a physical layer frame of the LPWA protocol.

17 Claims, 10 Drawing Sheets

(51) Int. Cl.
*H04L 12/751* (2013.01)
*H04W 40/02* (2009.01)
(52) U.S. Cl.
CPC .......... *H04L 69/168* (2013.01); *H04L 69/321* (2013.01); *H04L 69/324* (2013.01); H04L 45/025 (2013.01); H04L 2212/00 (2013.01); H04W 40/02 (2013.01)
(58) Field of Classification Search
CPC .............. H04L 69/321; H04L 69/324; H04L 2212/00; H04L 12/66; H04L 29/06013; H04L 29/0602; H04L 29/06027; H04L 29/061276; H04L 29/0604; H04L 29/06074; H04L 29/08027; H04L 41/0226; H04L 1/00; H04L 12/2803; H04L 12/40; H04L 12/42; H04L 12/44; H04L 12/46; H04L 29/08018; H04L 29/08099; H04L 29/06006–0899; H04L 41/00; H04L 41/50; H04L 45/00; H04L 47/10; H04L 49/90; H04L 61/10; H04L 61/25; H04L 61/30; H04L 61/6063; H04L 65/102; H04L 65/1033; H04L 65/1036; H04L 65/104; H04L 65/60; H04L 67/025; H04L 67/1002; H04L 67/104; H04L 67/125; H04L 67/16; H04L 67/18; H04L 67/322; H04L 67/327; H04L 69/16; H04L 69/166; H04L 69/169; H04L 69/30; H04L 69/32–329; H04L 2012/5667; H04W 40/02; H04W 4/00; H04W 8/005; H04W 40/023–22; H04W 48/20; H04W 80/04; H04W 80/06; H04W 84/18; A61B 5/0002; A63F 13/30; B60R 16/023; B60W 16/023; B64C 13/503; B64C 39/024; B64D 11/0015; E21B 47/12; G01V 1/22; G05B 19/4185; G05D 1/00; G06F 9/54; G06F 13/00; G06F 13/102; G06F 13/28; G06F 15/173; G06F 16/1794; G06F 16/88; G07C 5/00; G08B 25/00; G08G 5/00; H04B 1/202; H04B 7/18506; H04M 7/00; H04M 11/002; H04M 11/007; H04M 11/04; H04N 21/2381; H04Q 3/0054; H04Q 11/0478; Y02D 30/70

See application file for complete search history.

(56) References Cited

U.S. PATENT DOCUMENTS

| | | | |
|---|---|---|---|
| 8,165,185 B2* | 4/2012 | Zhang | H04J 13/102 |
| | | | 375/135 |
| 9,614,877 B2* | 4/2017 | Shelby | H04L 67/02 |
| 9,652,955 B1* | 5/2017 | Ray | G01S 5/0081 |
| 10,098,164 B2* | 10/2018 | Lewis | H04W 12/0017 |
| 2003/0035438 A1 | 2/2003 | Larsson | |
| 2006/0101262 A1 | 5/2006 | Haney | |
| 2015/0163692 A1 | 6/2015 | Babaei | |
| 2015/0222542 A1 | 8/2015 | Inada | |
| 2018/0254905 A1* | 9/2018 | Chun | H04W 4/70 |

OTHER PUBLICATIONS

Sornin, N., et al. "LoRa Alliance LoRaWAN(TM) Specification," LoRa Alliance, Version: 1.0.2, Published: Jul. 2016, pp. 1-70 (Year: 2016).*
International Preliminary Report on Patentability issued for PCT Application Serial No. PCT/US2016/046651, dated Feb. 12, 2019; 9 pages.
International Search Report dated May 8, 2017 for PCT/US2016/046651, 3 pages.
Karhula, Pekka, "Internet of Things: a gateway centric solution for providing IoT connectivity", Department of Mathematical Information Technology, Kokkola University Consortium Chydenius, May 26, 2016, 75 pages.
Written Opinion of the International Searching Authority dated May 7, 2017 for PCT/US2016/046651, 7 pages.
EPO; Extended European Search Report issued in EP Patent Application No. 16912840.2, dated Jan. 7, 2020; 10 pages.
Higuera, Jorge E., et al; "IEEE 1451 Standard in 6LowPAN Sensor Networks Using a Compact Physical-Layer Transducer Electronic Datasheet," IEEE Transactions on Instrumentation and Measurement, vol. 60, No. 8; New Jersey; Aug. 2011; 8 pages.
EPO; Extended European Search Report issued in EP Patent Application No. 20200279.6, dated Feb. 22, 2021; 10 pages.

* cited by examiner

| Flag | AX.25 Transfer Frame Header (128 bits) | | | | Information Field | Frame-Check Sequence | Flag |
|---|---|---|---|---|---|---|---|
| | Destination Address | Source Address | Control Bits | Protocol Identifier | | | |
| 1 Byte | 7 Bytes | 7 Bytes | 1 Byte | 1 Byte | <236 Bytes | 2 Bytes | 1 Byte |

LOW POWER WIDE AREA INTERNET PROTOCOL COMMUNICATION

CROSS-REFERENCE TO RELATED APPLICATIONS

This application is a national stage application under 35 U.S.C. § 371 of PCT International Application Serial No. PCT/US2016/046651, filed on Aug. 12, 2016, and entitled LOW POWER WIDE AREA INTERNET PROTOCOL COMMUNICATION. The disclosure of the prior application is considered part of and is hereby incorporated by reference in its entirety in the disclosure of this application.

TECHNICAL FIELD

This disclosure relates in general to the field of computer systems and, more particularly, to machine-to-machine system communications.

BACKGROUND

The Internet has enabled interconnection of different computer networks all over the world. While previously, Internet-connectivity was limited to conventional general purpose computing systems, ever increasing numbers and types of products are being redesigned to accommodate connectivity with other devices over computer networks, including the Internet. For example, smart phones, tablet computers, wearables, and other mobile computing devices have become very popular, even supplanting larger, more traditional general purpose computing devices, such as traditional desktop computers in recent years. Increasingly, tasks traditionally performed on a general purpose computers are performed using mobile computing devices with smaller form factors and more constrained features sets and operating systems. Further, traditional appliances and devices are becoming "smarter" as they are ubiquitous and equipped with functionality to connect to or consume content from the Internet. For instance, devices, such as televisions, gaming systems, household appliances, thermostats, automobiles, watches, have been outfitted with network adapters to allow the devices to connect with the Internet (or another device) either directly or through a connection with another computer connected to the network. Additionally, this increasing universe of interconnected devices has also facilitated an increase in computer-controlled sensors that are likewise interconnected and collecting new and large sets of data. The interconnection of an increasingly large number of devices, or "things," is believed to foreshadow a new era of advanced automation and interconnectivity, referred to, sometimes, as the Internet of Things (IoT).

BRIEF DESCRIPTION OF THE DRAWINGS

FIG. 5 is a representation of an example modified data link layer frame format.

Like reference numbers and designations in the various drawings indicate like elements.

DETAILED DESCRIPTION OF EXAMPLE EMBODIMENTS

Figure 1A:
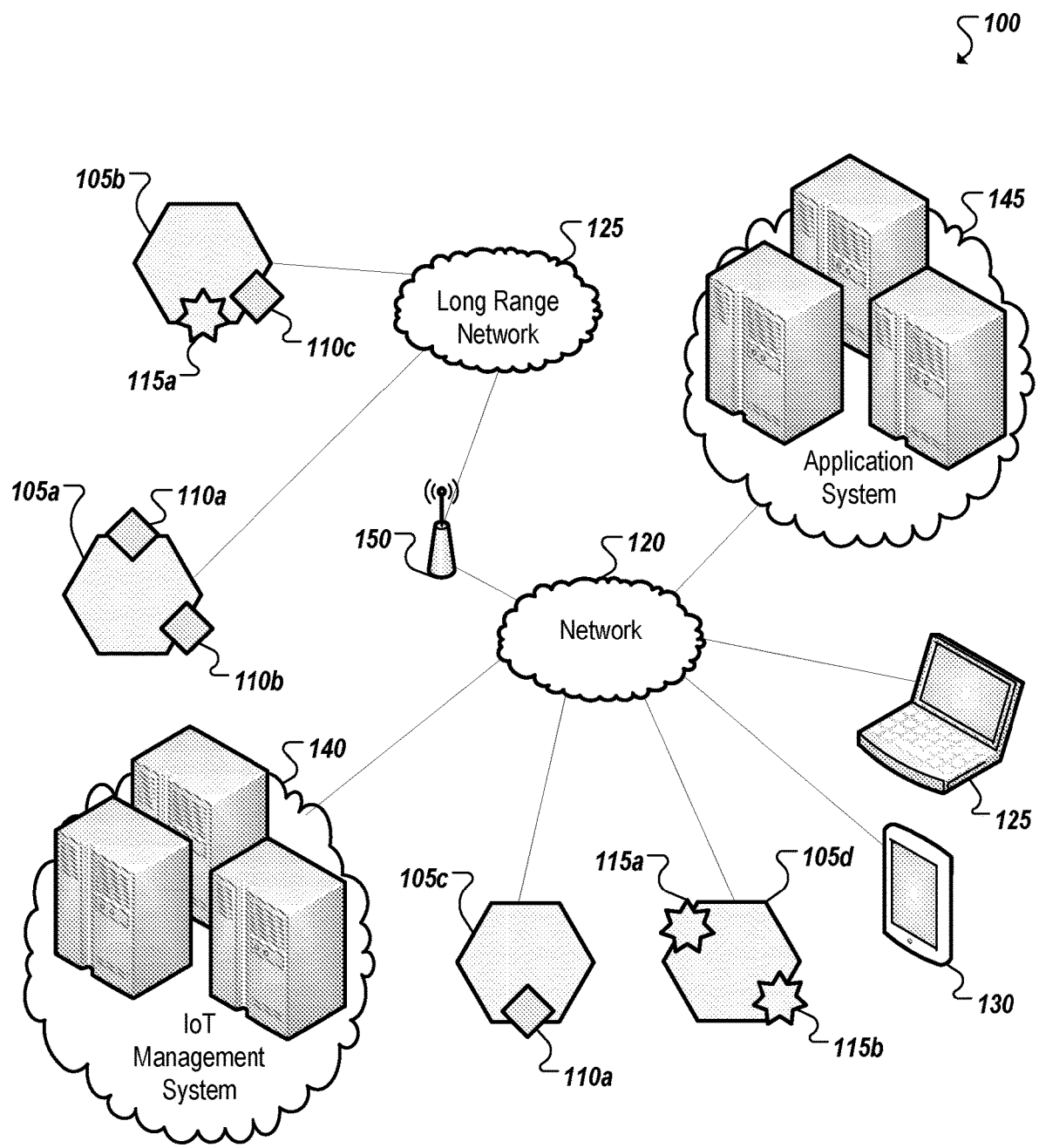
FIG. 1A illustrates an embodiment of a system including sensor devices adapted for and an example management system.

FIG. 1A is a block diagram illustrating a simplified representation of a system 100 that includes one or more devices 105*a-d*, or assets, deployed throughout an environment. Each device 105*a-d* may include a computer processor and/or communications module to allow each device 105*a-d* to interoperate with one or more other devices (e.g., 105*a-d*) or systems in the environment. Each device can further include one or more instances of various types of sensors (e.g., 110*a-c*), actuators (e.g., 115*a-b*), storage, power, computer processing, and communication functionality which can be leveraged and utilized (e.g., by other devices or software) within a machine-to-machine (M2M), or Internet of Things (IoT) system or application. In some cases, inter-device communication and even deployment of an IoT application may be facilitated by one or more gateway devices (e.g., 150) through which one or more of the devices (e.g., 105*a-d*) communicate and gain access to other devices and systems in one or more networks (e.g., 120).

In some instances, devices (e.g., 105*c-d*) may be configured with communication modules to support communication over local area networks, using communication technologies such as WiFi, Bluetooth, Zigbee, etc. Such devices (e.g., 105*c-d*) may participate in a local area network of a home, office, manufacturing facility, warehouse, or other environment. In some cases, devices (e.g., 105*c-d*) may utilize these short-range wireless channels to connect to a wide area network 120 (such as the Internet through a local gateway). Such devices may utilize these local wireless channels to participate in a M2M or IoT system. M2M or IoT systems may additionally be formed to include remote devices (e.g., 105*a-b*).

Remote devices 105*a-b* may be remote from a primary location for which an example IoT system is launched. In some cases, there may be no primary location associated with ah IoT system deployment. Indeed, in some cases, each of the devices (e.g., 105*a-d*) may be remotely located with respect to one another. Further, in some implementations, devices (e.g., 105*a-b*) may connect over long-range wireless channels (e.g., of a long range network 125). For instance, devices (e.g., 105*a-b*) may be capable of communicating over long range radio 125, such that a device (e.g., 105*a*) may communicate with another sensor device 105*b* or gateway device 150 that is located several kilometers away (e.g., 10-30 km). Further, by connecting to a gateway device (e.g., 150) over a long-range wireless network 125, devices (e.g., 150*a-b*) that may otherwise not have access to the Internet or other networks (e.g., 120) may be able to connect to such networks 120 and report to or access data from system (e.g., 15*c-d*, 130, 135, 140, 145) connecting to these networks 120. As an example, a sensor device (e.g., 105*a*) deployed within a field, mountain, solar farm, remote highway, or other less populated area (where cellular or other network connectivity is limited), may utilize a long range wireless radio network 125 to participate in an M2M or IoT system (e.g., including other devices connected to the long range network 125 or devices connected through another more traditional network (e.g., 120), such as one utilizing or otherwise supporting Internet Protocol (IP). The gateway device 150 may thereby function as an IP router for the LPWA-enabled endpoints to which it connects.

Sensors, or sensor assets, are capable of detecting, measuring, and generating sensor data describing characteristics of the environment in which they reside, are mounted, or are in contact with. For instance, a given sensor (e.g., 110*a-c*) may be configured to detect one or more respective characteristics such as movement, weight, physical contact, temperature, wind, sound, light, computer communications, wireless signals, visual images, position, flow, pressure, humidity, the presence of radiation, liquid, other devices, or specific chemical compounds, among several other examples. Indeed, sensors (e.g., 110*a-c*) as described herein, anticipate the development of a potentially limitless universe of various sensors, each designed to and capable of detecting, and generating corresponding sensor data for, new and known environmental characteristics and information. Actuators (e.g., 115*a-b*) can allow the device to perform some kind of action to affect its environment. For instance, one or more of the devices (e.g., 105*b, d*) may include one or more respective actuators that accepts an input and performs (or triggers) an action in response. Actuators can include controllers to activate additional functionality, such as an actuator to selectively toggle or otherwise adjust the power or operation of an alarm, camera (or other sensors), heating, ventilation, and air conditioning (HVAC) appliance, household appliance, in-vehicle device, lighting, among other examples.

In some implementations, sensors 110*a-c* and actuators 115*a-b* provided on devices 105*a-d* can be assets incorporated in and/or forming an Internet of Things (IoT) or machine-to-machine (M2M) system. IoT systems can refer to new or improved ad-hoc systems and networks composed of multiple different devices interoperating and synergizing to deliver one or more results or deliverables. Such ad-hoc systems are emerging as more and more products and equipment evolve to become "smart" in that they are controlled or monitored by computing processors and provided with facilities to communicate, through computer-implemented mechanisms, with other computing devices (and products having network communication capabilities). For instance, IoT systems can include networks built from sensors and communication modules integrated in or attached to "things" such as equipment, toys, tools, vehicles, etc. and even living things (e.g., plants, animals, humans, etc.). In some instances, an IoT system can develop organically or unexpectedly, with a collection of sensors monitoring a variety of things and related environments and interconnecting with data analytics systems and/or systems controlling one or more other smart devices to enable various use cases and application, including previously unknown use cases. Further, IoT systems can be formed from devices that hitherto had no contact with each other, with the system being composed and automatically configured spontaneously or on the fly (e.g., in accordance with an IoT application defining or controlling the interactions). Further, IoT systems can often be composed of a complex and diverse collection of connected devices (e.g., 105*a-d*), such as devices sourced or controlled by varied groups of entities and employing varied hardware, operating systems, software applications, and technologies. In some cases, a gateway (e.g., 150) may be provided to localize a particular IoT system, with the gateway able to detect nearby devices (e.g., 105*a-d*) and deploy (e.g., in an automated, impromptu manner) an instance of a particular IoT application by orchestrating configuration of these detected devices to satisfy requirements of the particular IoT application, among other examples.

Facilitating the successful interoperability of such diverse systems is, among other example considerations, an important issue when building or defining an IoT system. Software applications can be developed to govern how a collection of IoT devices can interact to achieve a particular goal or service. In some cases, the IoT devices may not have been originally built or intended to participate in such a service or in cooperation with one or more other types of IoT devices. Indeed, part of the promise of the Internet of Things is that innovators in many fields will dream up new applications involving diverse groupings of the IoT devices as such devices become more commonplace and new "smart" or "connected" devices emerge. However, the act of programming, or coding, such IoT applications may be unfamiliar to many of these potential innovators, thereby limiting the ability of these new applications to be developed and come to market, among other examples and issues.

As shown in the example of FIG. 1A, multiple IoT devices (e.g., 105*a-d*) can be provided from which one or more different IoT applications can be built. For instance, a device (e.g., 105*a-d*) can include such examples as a mobile personal computing device, such as a smart phone or tablet device, a wearable computing device (e.g., a smart watch, smart garment, smart glasses, smart helmet, headset, etc.), purpose-built devices such as and less conventional computer-enhanced products such as home, building, vehicle automation devices (e.g., smart heat-ventilation-air-conditioning (HVAC) controllers and sensors, light detection and controls, energy management tools, etc.), smart appliances (e.g., smart televisions, smart refrigerators, etc.), smart traffic management, driverless vehicle control, smart agriculture, and other examples. Some devices can be purpose-built to host sensor and/or actuator resources, such as a weather sensor devices that include multiple sensors related to weather monitoring (e.g., temperature, wind, humidity sensors, etc.), traffic sensors and controllers, among many other examples. Some devices may be statically located, such as a device mounted within a building, on a lamppost, sign, water tower, secured to a floor (e.g., indoor or outdoor), or other fixed or static structure. Other devices may be mobile, such as a sensor provisioned in the interior or exterior of a vehicle, in-package sensors (e.g., for tracking cargo), wearable devices worn by active human or animal users, an aerial, ground-based, or underwater drone among other examples. Indeed, it may be desired that some sensors move within an environment and applications can be built around use cases involving a moving subject or changing environment using such devices, including use cases involving both moving and static devices, among other examples.

Continuing with the example of FIG. 1A, software-based IoT management platforms can be provided to allow developers and end users to build and configure IoT applications and systems. An IoT application can provide software support to organize and manage the operation of a set of IoT device for a particular purpose or use case. In some cases, an IoT application can be embodied as an application on an operating system of a user computing device (e.g., 130), a mobile app for execution on a smart phone, tablet, smart watch, or other mobile device (e.g., 135), a remote server, and/or gateway device. In some cases, the application can have or make use of an application management utility allowing users to configure settings and policies to govern how the set devices (e.g., 105*a*-*d*) are to operate within the context of the application. A management utility can also be used to orchestrate the deployment of a particular instance of an IoT application, including the automated selection and configuration of devices (and their assets) that are to be used with the application. In some cases, an IoT management application may be provided (e.g., on a gateway, user device, or cloud-based server, etc.), which can manage potentially multiple different IoT applications or systems. Indeed, an IoT management application, or system, may be hosted on a single system, such as a single server system (e.g., 140), a single end-user device (e.g., 130, 135), or a single gateway device, among other examples. Alternatively, an IoT management system can be distributed across multiple hosting devices (e.g., 130, 135, 140, 150, etc.).

In some cases, applications can be programmed, or otherwise built or configured, utilizing interfaces of an IoT management system or a dedicated IoT application development platform. In some cases, IoT application development tools can adopt asset abstraction to simplify the IoT application building process. For instance, users can simply select classes, or taxonomies, of devices and logically assemble a collection of select devices classes to build at least a portion of an IoT application (e.g., without having to provide details regarding configuration, device identification, data transfer, etc.). IoT application development tools may further utilize asset abstraction to develop and define deployment of one or more graphical user interfaces (GUIs) for use in a deployment of the resulting IoT application, to allow user control and management of a deployment during runtime. Further, IoT application systems built using the IoT management system can be sharable, in that a user can send data identifying the constructed system to another user, allowing the other user to simply port the abstracted system definition to the other user's environment (even when the combination of device models is different from that of the original user's system). Additionally, system or application settings, defined by a given user, can be configured to be sharable with other users or portable between different environments, among other example features.

In some cases, IoT systems can interface (through a corresponding IoT management system or application or one or more of the participating IoT devices) with remote services, such as data storage, information services (e.g., media services, weather services), geolocation services, and computational services (e.g., data analytics, search, diagnostics, etc.) hosted in cloud-based and other remote systems (e.g., 140, 145). For instance, the IoT system can connect to a remote service (e.g., 145) over one or more networks 120, 125. In some cases, the remote service can, itself, be considered an asset of an IoT application. Data received by a remotely-hosted service can be consumed by the governing IoT application and/or one or more of the component IoT devices to cause one or more results or actions to be performed, among other examples.

One or more networks (e.g., 120, 125) can facilitate communication between sensor devices (e.g., 105*a*-*d*), end user devices (e.g., 130, 135), gateways (e.g., 150), and other systems (e.g., 140, 145) utilized to implement and manage IoT applications in an environment. Such networks can include wired and/or wireless local networks, public networks, wide area networks, long range low power networks, broadband cellular networks, satellite networks, the Internet, and the like. Gateway devices (e.g., 150) may be utilized to effectively bridge communications between networks. For instance, a gateway device (e.g., 150) may receive data from a long range network 125 and process the data for forwarding on the Internet (e.g., 120) and likewise receive data from resources on the Internet 120 and process the data for forwarding to devices (e.g., 105*a*-*b*) connected to long range network 125, among other examples. A gateway device (e.g., 150) may be implemented as a dedicated gateway element, or may be a multi-purpose or general purpose device, such as another IoT device (similar to devices 105*a*-*d*) or user device (e.g., 130, 135) that itself may include sensors and/or actuators to perform tasks within an IoT system, among other examples.

In general, "servers," "clients," "computing devices," "network elements," "hosts," "system-type system entities," "user devices," "gateways," "IoT devices," "sensor devices," and "systems" (e.g., 105*a*-*d*, 130, 135, 140, 145, 150, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing apparatus. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

While FIG. 1A is described as containing or being associated with a plurality of elements, not all elements illustrated within computing environment 100 of FIG. 1A may be utilized in each alternative implementation of the present disclosure. Additionally, one or more of the elements described in connection with the examples of FIG. 1A may be located external to computing environment 100, while in other instances, certain elements may be included within or as a portion of one or more of the other described elements, as well as other elements not described in the illustrated implementation. Further, certain elements illustrated in FIG. 1A may be combined with other components, as well as used for alternative or additional purposes in addition to those purposes described herein.

As noted above, a collection of devices, or endpoints, may participate in Internet-of-things (IoT) network, which may utilize wireless local area networks (WLAN), such as those standardized under IEEE 802.11 family of standards, home-area networks such as those standardized under the Zigbee Alliance, personal-area networks such as those standardized by the Bluetooth Special Interest Group, cellular data networks, such as those standardized by the Third-Generation Partnership Project (3GPP), LPWA networks, and other types of networks, having wireless, or wired, connectivity. For example, an endpoint device may also achieve connectivity to a secure domain through a bus interface, such as a universal serial bus (USB)-type connection, a High-Definition Multimedia Interface (HDMI), or the like.

Figure 1B:
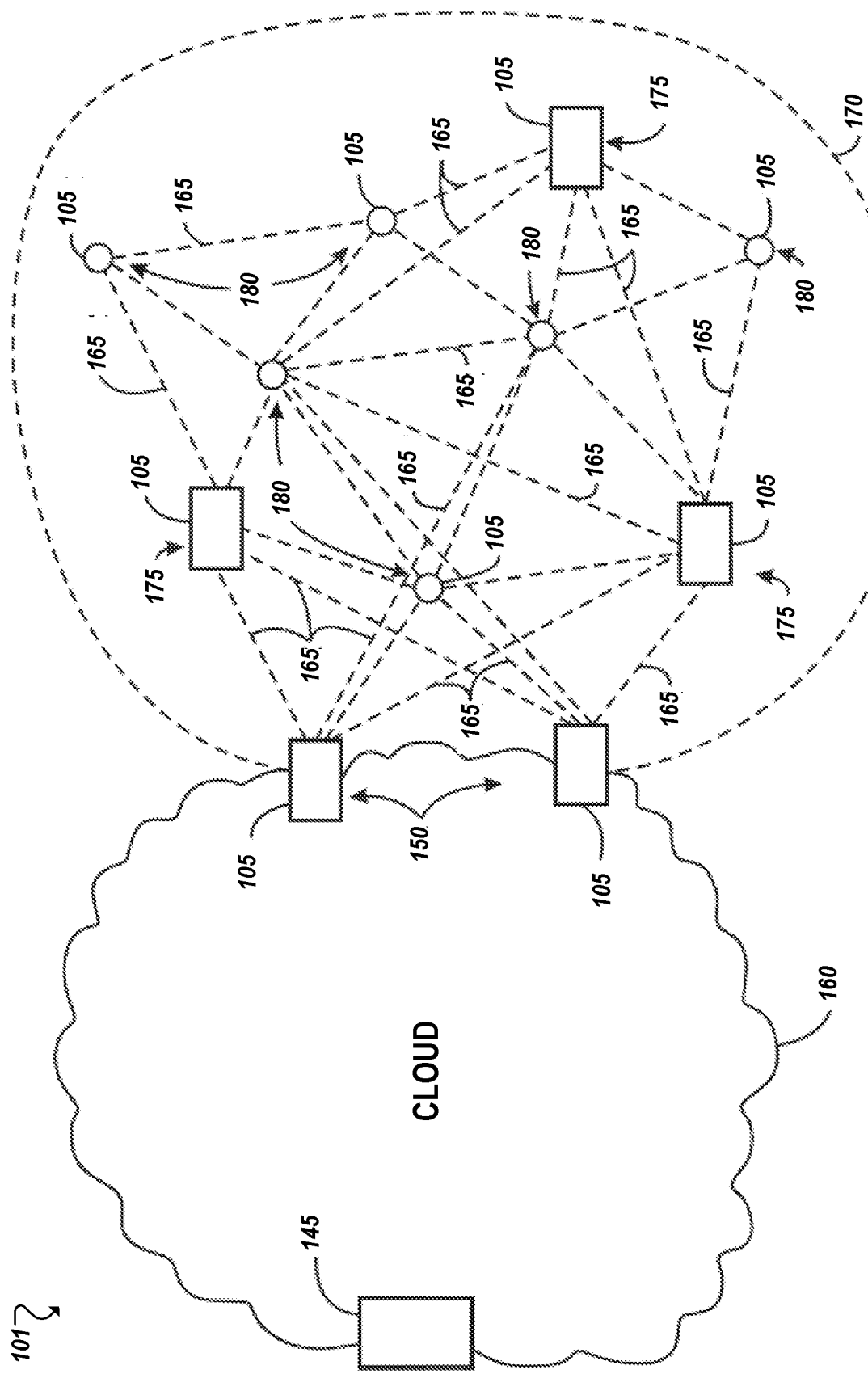
FIG. 1B illustrates an embodiment of a cloud computing network.

As shown in the simplified block diagram 101 of FIG. 1B, in some instances, a cloud computing network, or cloud, in communication with a mesh network of IoT devices (e.g., 105a-d), which may be termed a "fog," may be operating at the edge of the cloud. To simplify the diagram, not every IoT device 105 is labeled.

The fog 170 may be considered to be a massively interconnected network wherein a number of IoT devices 105 are in communications with each other, for example, by radio links 165. This may be performed using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the optimized link state routing (OLSR) Protocol, or the better approach to mobile ad-hoc networking (B.A.T. M.A.N.), among others.

Three types of IoT devices 105 are shown in this example, gateways 150, data aggregators 175, and sensors 180, although any combinations of IoT devices 105 and functionality may be used. The gateways 150 may be edge devices that provide communications between the cloud 160 and the fog 170, and may also function as charging and locating devices for the sensors 180. The data aggregators 175 may provide charging for sensors 180 and may also locate the sensors 180. The locations, charging alerts, battery alerts, and other data, or both may be passed along to the cloud 160 through the gateways 150. As described herein, the sensors 180 may provide power, location services, or both to other devices or items.

Communications from any IoT device 105 may be passed along the most convenient path between any of the IoT devices 105 to reach the gateways 150. In these networks, the number of interconnections provide substantial redundancy, allowing communications to be maintained, even with the loss of a number of IoT devices 105.

The fog 170 of these IoT devices 105 devices may be presented to devices in the cloud 160, such as a server 145, as a single device located at the edge of the cloud 160, e.g., a fog 170 device. In this example, the alerts coming from the fog 170 device may be sent without being identified as coming from a specific IoT device 105 within the fog 170. For example, an alert may indicate that a sensor 180 needs to be returned for charging and the location of the sensor 180, without identifying any specific data aggregator 175 that sent the alert.

In some examples, the IoT devices 105 may be configured using an imperative programming style, e.g., with each IoT device 105 having a specific function. However, the IoT devices 105 forming the fog 170 may be configured in a declarative programming style, allowing the IoT devices 105 to reconfigure their operations and determine needed resources in response to conditions, queries, and device failures. Corresponding service logic may be provided to dictate how devices may be configured to generate ad hoc assemblies of devices, including assemblies of devices which function logically as a single device, among other examples. For example, a query from a user located at a server 145 about the location of a sensor 180 may result in the fog 170 device selecting the IoT devices 105, such as particular data aggregators 175, needed to answer the query. If the sensors 180 are providing power to a device, sensors associated with the sensor 180, such as power demand, temperature, and the like, may be used in concert with sensors on the device, or other devices, to answer a query. In this example, IoT devices 105 in the fog 170 may select the sensors on particular sensor 180 based on the query, such as adding data from power sensors or temperature sensors. Further, if some of the IoT devices 105 are not operational, for example, if a data aggregator 175 has failed, other IoT devices 105 in the fog 170 device may provide substitute, allowing locations to be determined.

Further, the fog 170 may divide itself into smaller units based on the relative physical locations of the sensors 180 and data aggregators 175. In this example, the communications for a sensor 180 that has been instantiated in one portion of the fog 170 may be passed along to IoT devices 105 along the path of movement of the sensor 180. Further, if the sensor 180 is moved from one location to another location that is in a different region of the fog 170, different data aggregators 175 may be identified as charging stations for the sensor 180.

As an example, if a sensor 180 is used to power a portable device in a chemical plant, such as a personal hydrocarbon detector, the device will be moved from an initial location, such as a stockroom or control room, to locations in the chemical plant, which may be a few hundred feet to several thousands of feet from the initial location. If the entire facility is included in a single fog 170 charging structure, as the device moves, data may be exchanged between data aggregators 175 that includes the alert and location functions for the sensor 180, e.g., the instantiation information for the sensor 180. Thus, if a battery alert for the sensor 180 indicates that it needs to be charged, the fog 170 may indicate a closest data aggregator 175 that has a fully charged sensor 180 ready for exchange with the sensor 180 in the portable device.

With the growth of IoT devices and system, there are increasing numbers of smart and connected devices available in the market, such as devices capable of being utilized in home automation, factory automation, smart agriculture, and other IoT applications and systems. For instance, in home automation systems, automation of a home is typically increased as more IoT devices are added for use in sensing and controlling additional aspects of the home. New and developing IoT devices are prompting the development of new services to automate existing industries and create new ones. Indeed, IoT is impacting growth across many market sectors, including sensors, where the number of units produced and employed is expected to exceed tens of billions of devices within the next decade. Many IoT technologies are evolving and bringing computer processing power and/or network connectivity to previously un-connected and "dumb" devices and systems. Further, developments in IoT are bringing IP connectivity to originally non-IP technologies. This can allow security and other higher level IP-based services to data communicated using such technologies.

While many IoT developments have focused on bringing M2M connectivity, applications, and services to localized or closed IoT systems, such as a smart home, smart office building, or smart manufacturing facility, other more distributed IoT use cases have struggled to develop similarly robust IoT/M2M systems, given that some of the IoT devices may not be able to connect to networks that support IP-based services.

While low-power wide area (LPWA) communication technologies are being developed to enable long-range inter-device communications (e.g., over single hop channels spanning tens of kilometers between transmitting and receiving devices). Such technologies include, for instance, like LoRa™, SigFox™, Weightless™, and MIOTY™ and are opening new markets for IoT and LPWA connectivity. Such LPWA technologies provide respective, non-standard physical (PHY) and/or media access control (MAC) layers. Unlike standardized technologies such as IEEE 802.15.4, WiFi, and Bluetooth, many emerging LPWA technologies are not governed by a standards organization and utilize non-standard-based, proprietary modulations, and are not adapted to support IP communications.

In some implementations disclosed herein, non-IP LPWA IoT communication technologies may be modified to support IP connectivity (e.g., IPv4, IPv6, 6LowPAN, etc.). For instance, IP connectivity can be provided over non-standardized, single hop, long-range wireless links. By bringing IP connectivity to such non-IP technologies, routing algorithms and IP-based transports and applications (e.g., Constrained Application Protocol (CoAP), Message Queuing Telemetry Transport (MQTT), Trivial File Transport Protocol (TFTP), Secure Shell cryptography (SSH), etc.) may be implemented to enable reliable, resilient, and secure IoT communication in corresponding IoT systems utilizing these modified communication technologies. Accordingly, IoT devices designed to support LPWA communications may be modified to support IP over LPWA communications. Such devices (e.g., 105a-b) may thereby perform elementary IP operations including negotiating an IP address in DHCP, supporting ping commands, participate in secure login algorithms (e.g., using SSH), support more sophisticated file transports (e.g., using TFTP), and support routing over IP networks with CoAP and MQTT as a transport layer, among other examples. Such functionality can allow an enabled IoT device to be identifiable by its IP address (IPv4 or IPv6) in a broader IoT network, rather than relying on proprietary addressing protocols like LoRaWAN, SigFox Network, and Weightless, which may complicate applying policies and configurations and integrating the device in a broader IoT network. Further, this may bring resiliency in connected mode (TCP), enable enhanced security in communication, and enable the device's participation in higher-level, IP-based activities (e.g., file transfers, firmware updates (e.g., through TFTP or SSH), among other examples).

Figure 2:
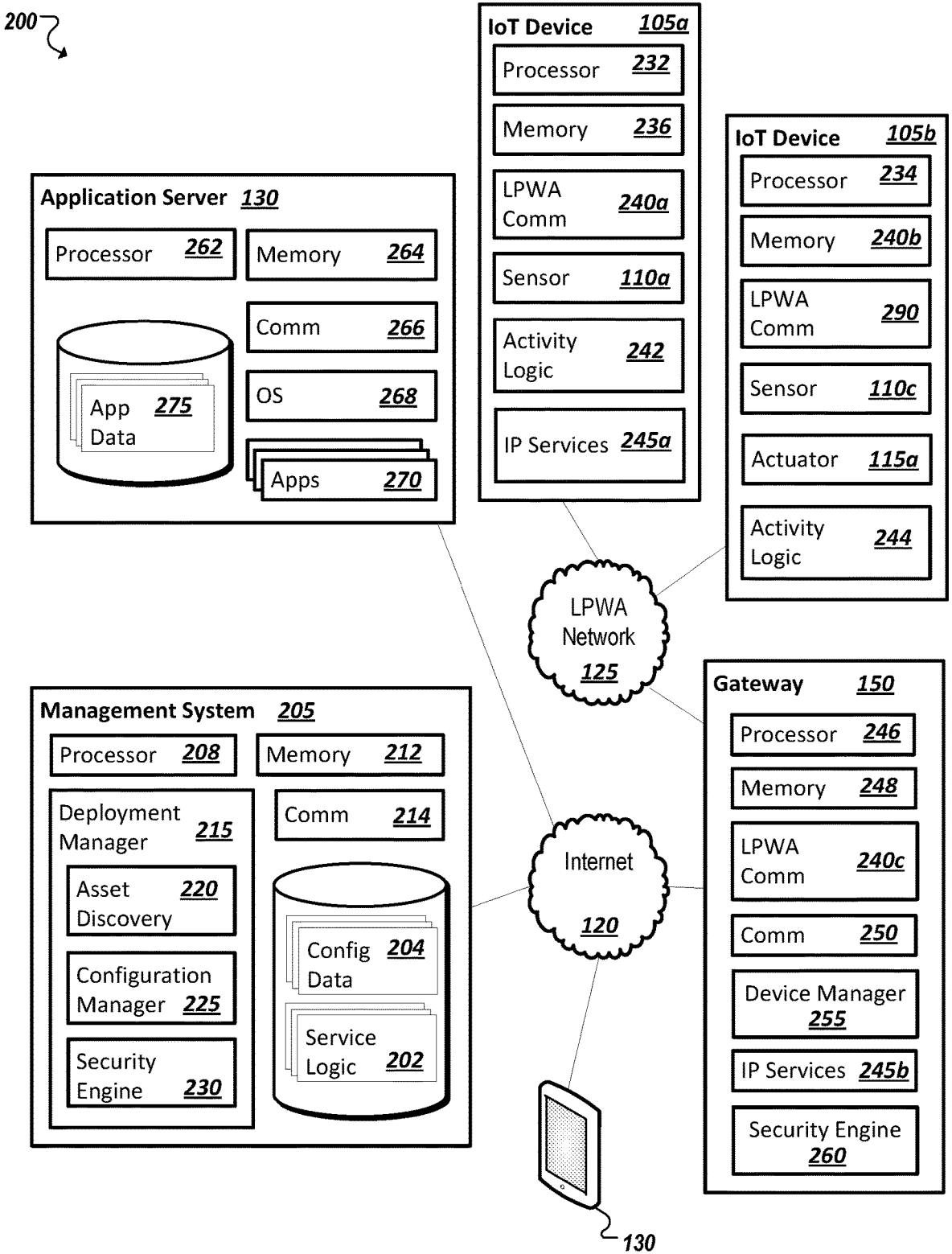
FIG. 2 illustrates an embodiment of a system including an example management system and one or more devices with low power wide area (LPWA) communication capabilities.

Systems, such as those shown and illustrated herein, may include machine logic implemented in hardware and/or software to implement the solutions introduced herein and address at least some of the example issues above (among others). For instance, FIG. 2 shows a simplified block diagram 200 illustrating a system including multiple IoT devices (e.g., 105a-b) with assets (e.g., sensors (e.g., 110a,c) and/or actuators (e.g., 115a)) capable of being used in a variety of different IoT applications. In the example of FIG. 2, a management system 205 is provided with deployment manager logic 210 (implemented in hardware and/or software) to detect assets on one or more networks and identify opportunities to deploy an IoT system utilizing the detected assets. In some implementations, at least a portion of the service logic (e.g., 202) utilized to drive the function of the IoT application may be hosted on the management system 205. Service logic (e.g., 202) may also be hosted (additionally or alternatively) on one or more remote computing devices remote from the management system 205, including on devices (e.g., 105a-b) utilized within the IoT application deployment, servers within the environment in which the IoT application will be deployed, and/or cloud-based systems (remote from the location where the IoT application will be deployed). Configuration data (e.g., 204) to be used to configure the assets to be utilized in the deployment of the IoT system may also be hosted on the management system 205 or accessed by the management system 205 from one or more other systems, including a user device (e.g., 130) or a remote (e.g., cloud-based) server, among other example implementations.

In the particular example of FIG. 2, the management system 205 may include one or more data processing apparatus (or "processors") 208, one or more memory elements 212, and one or more communication modules 214 incorporating hardware and logic to allow the management system 205 to communicate over one or more networks (e.g., 120, 125), utilizing one or more technologies (e.g., WiFi, Bluetooth, Near Field Communications, Zigbee, Ethernet, LPWA, etc.), with other systems and devices (e.g., 105a, 105b, 130, 150, etc.). The deployment manager 215 may be implemented utilizing code executable by the processor 208 to manage the automated deployment of a local IoT system. In some cases, the management system 205 may be implemented on a dedicated physical system (e.g., separate from other devices in the IoT deployment). For instance, the management system 205 may be implemented on a gateway device (e.g., 150) used to facilitate communication with and between multiple potential IoT devices (e.g., 105a,b). In some instances, the management system 205 may be hosted at least in part on a user device (e.g., 130), including a user device that it utilized itself in the deployment of a particular IoT application. Indeed, portions of the management system 205 (and deployment manager 215) may be implemented on multiple devices, including some devices remote from the environment(s) in which the IoT application is to be deployed.

In one example, a deployment manager 215 may be provided that includes logical components such as an asset discovery module 220, a configuration manager 225, and security engine 230, among other example components (or combinations of the foregoing). The deployment manager 215 may access local (or remotely stored) service logic 202, configuration data 204, and other data to support an IoT application deployed utilizing various IoT devices (e.g., 105a,b), among other examples. In some implementations, asset discovery (e.g., using an asset discovery module 220) may be facilitated with assistance from one or more gateway devices (e.g., 150), which may have more detailed information for assets (e.g., 105a,b) on a network (e.g., LPWA network 125 or a Bluetooth network) that the management system 205 is not directly connected to, but the gateway 150 is. Upon launching and configuring an IoT system deployment, functionality of the management system 205 may dictate how the IoT system is to function at runtime. For instance, a security engine 230 may be provided to define and enforce security features and requirements for a particular IoT deployment. This may include certain IP-based or other network level features that are applied to communications sent and received by the individual IoT devices, including devices (e.g., 105a,b), which may be configured to communicate over less feature-rich wireless communication technology (e.g., over an LPWA network 125), among other examples.

In one example, an asset discovery module 220 may be provide functionality to allow the management system 205 to determine which IoT devices (e.g., 105a,b, 130) are within range of the management system 205 and thus fall within a particular location for which one or more IoT services may be deployed. In some implementations, the asset discovery module 220 may detect attributes of various devices or collect this information from the devices (e.g., 105a,b) themselves or through intermediate gateway devices (e.g., 150) to determine whether a device is suitable for inclusion in a collection of devices for a given IoT system or application. In some implementations, conditions can be defined for determining whether a device should be included in the collection. For instance, the asset discovery module 220 may attempt to identify, not only that it is capable of contacting a particular asset, but may also determine assets such as physical location, semantic location, temporal correlation, movement of the device (e.g., is it moving in the same direction and/or rate as the discovery module's host), permissions or access level requirements of the device, among other characteristics. As an example, in order to deploy smart water sensing control for every field in a collection of agricultural fields, an application may be deployed on a "per field basis" to find and configure one water sensing device in each of the designated fields, among potentially limitless other use case examples.

Conditions for discovery can be defined in service logic (e.g., 202) of a particular IoT application. For instance, criteria can be defined to identify which types of resources are needed or desired to implement an application. Such conditions can go beyond location, and include identification of the particular types of assets that the application is to use. For instance, the asset discovery module 220 may additionally identify attributes of the device, such as its model or type, through initial communications with a device, and thereby determine what assets and asset types (e.g., specific types of sensors, actuators, memory and computing resources, etc.) are hosted by the device. Accordingly, discovery conditions and criteria can be defined based on asset abstractions (or asset taxonomies) defined for the IoT application. Some criteria may be defined that is specific to a particular asset type, where the criteria has importance for some asset types but not for others in the context of the corresponding IoT application. Further, some discovery criteria may be configurable such that a user can custom-define at least some of the criteria or preferences used to select which devices to utilize in furtherance of an IoT application.

In some implementations, a deployment manager 215 can additionally provide functionality (e.g., through configuration manager 225) to allow configurations, or settings, to be applied to the selected participating devices (e.g., 105a,b) of the IoT application and the IoT application generally. A variety of different settings can be provided depending on the collection of assets to be used by the application and the overall objectives of the application. Default setting values can be defined and further tools can be provided to allow users to define their own values for the settings (e.g., a preferred temperature setting of an air conditioner, the number of seconds to lock a smart lock or locker, sensitivity setting utilized for triggering a motion sensor and control, etc.). What settings constitute the "ideal" may be subjective and involve some tinkering by the user. When the user is satisfied with the settings, the user may save the settings as a configuration. In some implementations, these configurations (e.g., 204) can be stored locally at the management system 205, a device (e.g., 105a,b), on an IoT gateway 150, or on the cloud. A management system 205 may additionally monitor configurations deployed in a system and identify opportunities to tune configurations (e.g., between deployments or even in real time) to optimize performance of the system, among other example features. In some cases, configurations can be shared, such that a user can share the settings they (or a management system) found ideal with other users (e.g., friends or social network contacts, etc.).

A configuration manager 225 may be additionally used in runtime (e.g., during and following deployment of an IoT system) to cause particular settings to be applied at the IoT devices (assets) selected for deployment with the service. The deployment manager 215 may include logic enabling the deployment manager 215 (and its composite modules) to communicate using a variety of different protocols with a variety of different devices. Indeed, the deployment manager 215 can even be used to translate between protocols to facilitate asset-to-asset communications. Further, the configuration manager 225 can send instructions to each of the selected assets for deployment to prompt each asset to adjust settings in accordance with those defined for the asset taxonomy in the setting configuration defined in configuration data pushed to (or pulled from) the configuration manager 225 during (and potentially also after) deployment.

A system utilizing a gateway enhanced with or by deployment manager 215 may be enabled to combine automatic resource management/provisioning with auto-deployment of services. A configuration manager 225 can allow resource configurations from one IoT system to be carried over and applied to another so that services can be deployed in various IoT systems. Auto-configuration can refer to the configuration of devices with configurations (e.g., 204) stored locally or on a remote node, to provide assets (and their host devices) with the configuration information to allow the asset to be properly configured to operate within a corresponding IoT application deployment. As an example, a device may be provided with configuration information usable by the device to tune a microphone sensor asset on the device so that is might properly detect certain sounds for use in a particular IoT system (e.g., tune the microphone to detect specific voice pitches with improved gain). Auto-deployment of a services may involves identification (or discovery) of available devices, device selection (or binding) based on service requirements (configuration options, platform, and hardware), and automated continuous deployment (or re-deployment) to allow the service to adapt to evolving conditions.

In one example, a management system 205 may be utilized to direct the deployment and running of a service on a set of devices within a particular location (e.g., a location corresponding to a gateway implementing the management system 205). In one example, management system 205 may trigger asset discovery in connection with the deployment of a particular application. A management system 205 may access service logic 202 for a particular application, or service, and may communicate with deployed devices (e.g., 105a-b, 130, etc.) to send data to the devices (e.g., to prompt certain actuators) or receive data (e.g., sensor data) from the devices in accordance with the corresponding service logic 202. A management system 205 may also utilize service logic 202 and provide received data as inputs to the logic and use the service logic 202 to generate results, including results which may be used to prompt certain actuators on the deployed devices. In some cases, the generation of these results may include utilizing remotely executed service logic, for instance, by sending a request to a backend service. Runtime management may also be utilized in connection with security management logic 230 to define security domains within a deployment, for instance, to secure communications between all or a subset of the deployed devices and a gateway and/or communications between the devices themselves, among other example features.

Portions of the application, or service logic, can be distributed during deployment, with service logic capable of being executed locally at the gateway (or even one of the deployment computing assets) and/or remote from the deployment location on a cloud-based or other remotely-located system (e.g., 130). Indeed, in some cases, the management system 205 may provide one or more assets or their host devices (e.g., 105a,b) with service logic for use during an IoT application's deployment. In some cases, the management system 205 may manage deployment and execution of multiple different applications (e.g., with corresponding sets of service logic 202). Different configurations (e.g., using different configuration data instances) of the same application may also be supported by a single management system (or gateway). Once assets are provisioned, the deployed assets can be used collectively for achieving the goals and functionality designed for the application.

Continuing with the description of FIG. 2, each of the IoT devices (e.g., 105a,b) may include one or more processors (e.g., 232, 234), one or more memory elements (e.g., 236, 238), and one or more communications modules (e.g., 240a, 240b) to facilitate their participation in various IoT application deployments. Each device (e.g., 105a,b) can possess unique hardware, sensors (e.g., 110a,c), actuators (e.g., 115a), and other logic (e.g., 242, 244) to realize the intended function(s) of the device (including driving or otherwise supporting the operation of the respective sensors and actuators, generating data from sensor readings, consuming data for actuator resources, etc.). For instance, devices may be provided with such resources as sensors of varying types (e.g., 110a, 110c), actuators (e.g., 115a) of varying types, energy modules (e.g., batteries, solar cells, etc.), computing resources (e.g., through a respective processor and/or software logic), security features, data storage, and other resources.

In some implementations, IoT devices (e.g., 105a,b) may be configured to communicate over long distances utilizing LPWA communication technologies. LPWA communications may be particularly well suited to various example use cases, such as for IoT devices that are deployed in remote locations, such as agricultural fields, forests, mountains, remote highways, remote railways, on or in bodies of water, airborne devices, etc. IoT devices may also be provided with LPWA communication capabilities where the IoT device is to interact with other devices in an IoT system that may at least sometimes be out of range of other communication networks, including WiFi, cellular broadband, and other networks. As some examples, IoT application may involve the use of a drone aircraft, smart car, or other device, which may, at times, be located several kilometers from sensors and other devices, from which it is to receive or to which is to provide data, among other examples. Accordingly, in some implementations, IoT devices 105a,b may be provided with LPWA communication modules (e.g., 240a,b). Further, in some examples, an LPWA communication module (e.g., 240a,b) may be augmented to support encapsulation of IP datagrams over an LPWA protocol, which is otherwise incompatible or does not support IP traffic. Enabling IP communication over LPWA channels may additional allow for IP-based services to be provided on traffic involving these LPWA-enabled devices (e.g., 105a,b). Indeed, a gateway 150 or even an endpoint IoT device (e.g., 105b) may be provided with logic (e.g., 245a,b) to provide or support IP-based services (e.g., CoAP, MQTT, TFTP, SSH, Routing Protocol for Low Power and Lossy Networks (LLN) (RPL), Telnet, IP Security (IPSec), Real-time Transport Protocol (RTP), Routing Information Protocol (RIP), Simple Network Management Protocol (SNMP), etc.).

A gateway 150 may be provided in some instances to assist in connecting one or more IoT devices (e.g., 105a,b) in a deployment to a broader network of IoT resources (e.g., found on another network 120 to which these devices do not and/or cannot connect). For instance, a gateway device 150 may be provided to connect devices (e.g., 105a,b) communicating over an LPWA network 125 to the internet or another network 120. In one example, gateway 150 may be provided with one or more processors (e.g., 246), one or more memory elements (e.g., 248), and one or more communications modules (e.g., 240c, 250). Communication modules (e.g., 240c, 250) of a gateway (e.g., 150) may provide the gateway with functionality to connect to multiple different networks (e.g., 120, 125) using potentially multiple different technologies. As an example, the gateway (e.g., 150) may be provided with an LPWA communication module 240c to allow it to connect and communicate over an LPWA network 125 and may further include one or more other communication modules (e.g., 250) to allow the gateway to further communicate using other technologies, such as WiFi, Bluetooth, Zigbee, Ethernet, and/or other technologies. In one example, the LPWA communication module 240c of the gateway 150 may also be enhanced to support IP traffic over LPWA signals. The additional communication modules (e.g., 250) of the gateway may further support (e.g., natively) IP traffic, allowing the gateway 150 to participate in and facilitate end-to-end IP traffic and IP-based services for corresponding transactions. Gateways 150, in some implementations, may further include additional functionality to assist in the deployment and management of IoT systems, as noted above. As an example, a gateway 150 may include a device manager 255 to identify and track devices and systems with which it communicates, such that it may forward device attribute data to a management system 205 of the IoT network, determine the appropriate communications protocols and policies to employ with various devices, and track the IoT application of which a given device (e.g., 105a,b) and particular device communications are a part. For instance, particular configurations and policies may be applied and enforced using the gateway 150 based on the IoT application(s) of which a given transaction or communication is a part. For instance, a gateway 150 may include a security engine 260 to enforce various security policies or provide various security features among other functionality (e.g., IP services logic 245b) to selectively apply various services (e.g., IP-based services) to traffic handled at the gateway 150 (e.g., based on attributes of the sending or receive device, IoT applications or deployments associated with the devices, etc.), among other examples.

As noted above, an IoT deployment and application may involve one or more backend services, such as provided by one or more application servers (e.g., 130). In one example, an application server 130 may include one or more data processing apparatus 262, one or more memory elements 264, and one or more communication modules 266 incorporating hardware and logic to allow the management system 205 to communicate over one or more networks (e.g., 120). The application server 130 may further run an operating system 268 and one or more applications 270. The applications 270 may consume and/or generate various data 275 hosted at the application server 130 (or other data stores). Applications 270 may, in some cases, include service logic utilized during runtime and/or deployment of an IoT system (e.g., including devices 105a,b) or may be services, which are consumed by elements of the service logic utilized in an IoT system deployment (e.g., and hosted on devices (e.g., 105a,b), management system 205, user device 130, or other machines associated with an IoT system's deployment. An application (e.g., 270) in one example may receive data generated by one or more sensor assets (e.g., 110a,c) of one or more devices (e.g., 105a,b) deployed in an IoT system and apply logic embodied in one or more application 270 to generate results, which may be presented in a report or graphical user interface (GUI) of a user device (e.g., 130). Such results may even be returned to one or more of the participating devices (e.g., 105*a,b*) for consumption by the deployed device (e.g., in connection with the triggering of an actuator asset (e.g., 115*a*) of the device (e.g., 105*b*)) during runtime of the IoT system, among other, potentially limitless examples.

User devices (e.g., 130) may be utilized in a variety of ways within an IoT application deployment. User devices may possess management system functionality, functionality of an IoT service development system, may be utilized to control or manage a particular IoT application (e.g., through a UI of the IoT application provided on the device 130), or to provide other assets (e.g., sensor, actuator, computing, or storage) for use in a particular IoT application deployment. In one example, a user device 130 may include a UI engine 265, which may be leveraged in a particular IoT application deployment to provide one or more UIs for use by a user in connection with the deployment. A user device 130 may include one or more data processors, one or more memory elements, a communication module enabling communication with other systems using wireless and/or wireline network connections, and an operating system on which one or more applications may be run. A user device 130 may include one or more input devices, which may embody sensors implementing a touchscreen interface, keyboard, tracker ball, camera, or other mechanism through which user inputs may be captured. A user device 130 may also include one or more presentation devices (e.g., driven by corresponding actuators) to implement a graphical display, an audio presentation (e.g., speakers), a light output (e.g., of an integrated LED flashlight or camera flash), or vibration motor to output vibration-based signals, among other examples. Input devices and presentation devices, and computing resources of a user device (e.g., 130) may be utilized to fulfill UI requirements of a particular IoT application, resulting in the deployment of a user device (e.g., 130) in connection with deployment of the particular IoT application, among other example uses.

Figure 3:
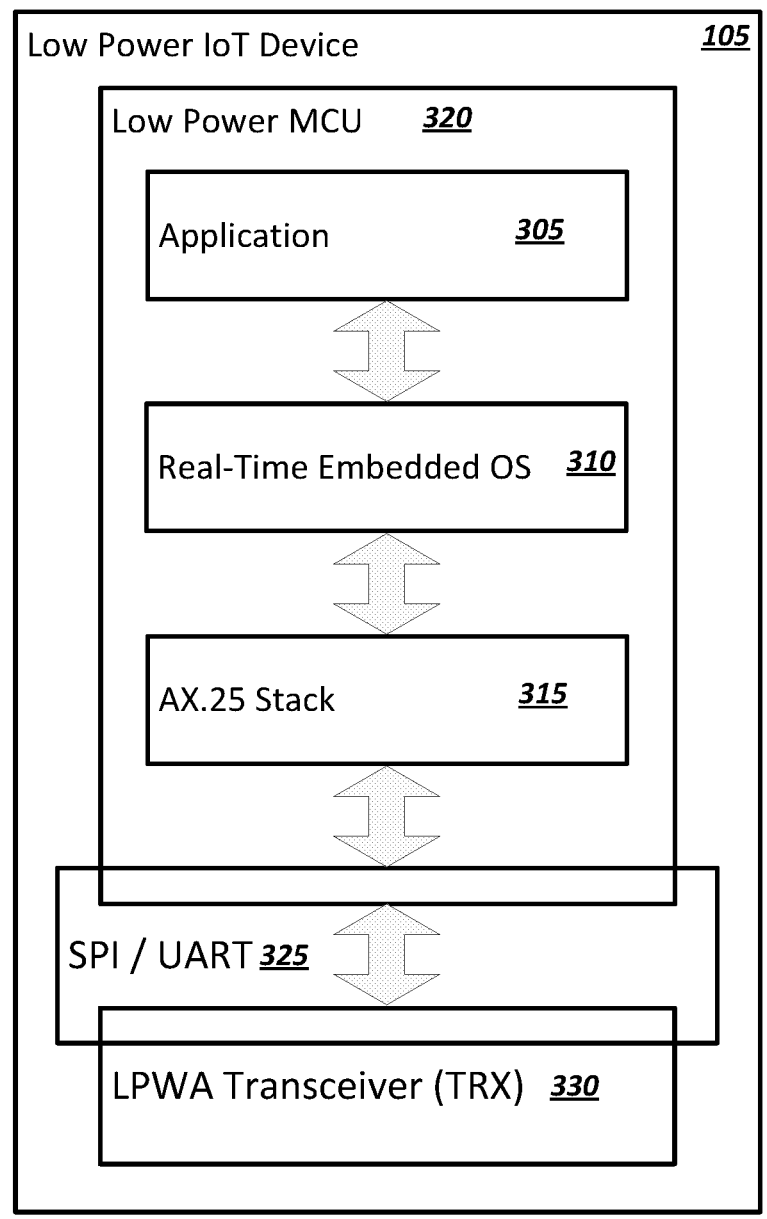
FIG. 3 is a simplified block diagram illustrating an example protocol stack of an enhanced LPWA communication module.

Turning to FIG. 3, a simplified block diagram 300 is presented illustrating an example implementation of a communication module supporting enhanced LPWA communications to support IP traffic over LPWA networks. In one example, an IoT device 105 implementing the enhanced LPWA communication module may include a low power microcontroller unit (MCU) 320 to realize a low power profile for the IoT device. For instance, the IoT device 105 may be a battery- or solar-powered device deployed in a remote environment where it is desirable to minimize power consumption of the device. In one example, a low power MCU 320 may be a low power, battery-operated, 32-bit microcontroller, with one or more processing cores (e.g., a 32 MHz core), integrated flash memory, dedicated random access memory (RAM) (e.g., static RAM (SRAM)), low power I/O, and a robust instruction set, among other example (or alternative) features. Further logical modules may be provided in connection with and for execution by or in concert with the MCU 320. For instance, one or more applications 305 (e.g., embodying service or activity logic of the device 105 or even logic used to provide support for IP over LPWA communications for the device 105) may be provided, running on top of an operating system (OS), such as a real-time embedded OS (e.g., FreeRTOS™, TinyOS™, RIOT™, Contiki™, Wind River Rocket™, Zephyr™, etc.). The MCU 320 may possess or interface with an LPWA radio and associated protocol logic (e.g., 330). The LPWA scheme may not natively possess functionality to support or be compatible with the sending of wireless IP traffic. In one implementation, the MCU 320 may further include logic to implement a low-frequency, wireless, data link layer, such as Amateur X.25 (AX.25), FX.25, and others. In some implementations, a low-frequency, wireless, data link layer, such as AX.25, may natively support both UDP and TCP traffic and implement fragmentation and reconstruction on its upper layers, among other features. The wireless data link layer protocol may be modified to enable an IP-based protocol stack. For instance, AX.25 may be utilized as a data link layer as it possesses a low bit rate, or frequency, which may be paired with an LPWA physical layer protocol, which has a similarly low bit rate (e.g., 300b/s to 21 Kb/s, etc.), to facilitate point-to-point radio channels over large one-hop distances. In one implementation, the protocol stack of the low-frequency data link layer may be modified to permit encapsulation of frames of the low-frequency data link layer within frames of an LPWA physical layer protocol such as Gaussian frequency-shift keying (GFSK)-based modulation scheme, binary phase-shift keying (BPSK) (e.g., as used by SigFox™), chirp spread spectrum (CSS) (e.g., as used by LoRa™), phase-shift keying (PSK) as used in Random Phase Multiple Access (RPMA), among other examples.

Continuing with the example of FIG. 3, in one implementation, the MCU 320 may be provisioned with a real-time embedded OS 310 that is configured to support an enhanced AX.25 logic stack 315. The data link layer logic 315 may be implemented by porting or provisioning the data link layer protocol (e.g., AX.25) on the targeted embedded real-time OS 310. IP connectivity may be enabled by modifying the data link layer protocol logic 315 such that desired IP services run on top of the data link layer logic 315. Such IP services may include, for instance, SSH for securely logging into the endpoint, TFTP for file transfer from and to the device and upper layer TCP and UDP for session oriented connection or connectionless sessions. On top of such a TCP/UDP stack, the application 305 running in the endpoint 105 can use CoAP and MQTT transport and services, among other examples.

In some implementations, the LPWA physical layer (PHY) may be a distinct device or module (e.g., 330) and may be interconnected with the MCU 320 through an interconnect link 325, such as a synchronous or asynchronous serial communication bus (e.g., Serial Peripheral Interface (SPI), universal asynchronous receiver/transmitter (UART), Peripheral Component Interconnect Express (PCIe), etc.). In such instances, the MCU 320 may managed, for instance, through UART attention (AT) commands, among other examples. The interconnect 325 may embody or include a hardware abstraction layer to abstract the hardware of the device, device assets (e.g., individual sensors, actuators, etc., the MCU, transceiver (e.g., 330), among other example hardware to the OS and enable the OS to communicate seamlessly with the transceiver and other hardware of the device. In some implementations, hardware and firmware logic implementing the LPWA PHY may be implemented within the MCU 320. The LPWA PHY logic may be any one of several defined LPWA technologies and protocols. Indeed, in some implementations, an endpoint IoT device (e.g., 105) or gateway may be equipped with logic to support and select from multiple different LPWA protocols. Additionally, the enhanced data link layer logic (e.g., 315) may be configured to configurable to generate and interpret data link layer frames augmented to be of a size to enable encapsulation in any one of potentially multiple different supported LPWA PHY protocols, among other examples. In other cases, link layer logic 315 may dynamically adjust data link layer frame sizes depending on the size allowances of a LPWA PHY selected for use by an endpoint (or gateway), among other example implementations.

Figure 4:
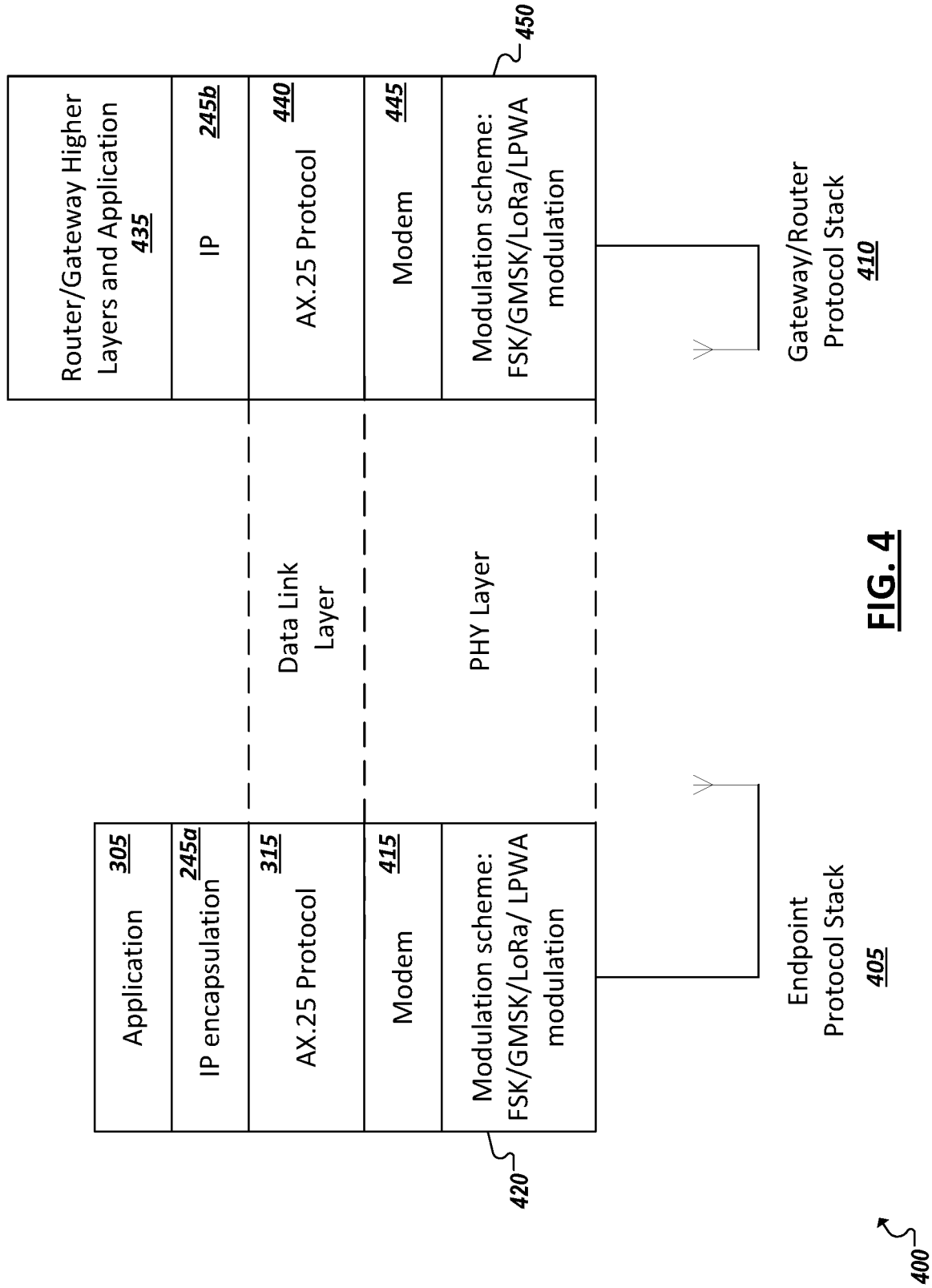
FIG. 4 is a simplified block diagram illustrating an example protocol stack of enhanced LPWA communication modules of an endpoint device and gateway device.

Turning to FIG. 4, a simplified block diagram 400 is shown representing interactions between an endpoint IoT device and a gateway in an example IoT system employing IP-enabled LPWA communications. In particular, FIG. 4 illustrates interactions between the protocol stacks (e.g., 405, 410) of an IoT device and gateway. Such protocol stacks (e.g., 405, 410) may be embodied in hardware elements and circuitry and/or software or firmware. For instance, an IoT endpoint protocol stack may include an application layer that includes the application 305 utilized by the IoT endpoint to drive its operation within the system, including management, control, and operation of sensor, actuator, communication, storage, and/or computing assets on the endpoint. The application 305 may be used to generate the data to be transmitted over the LPWA network. In other instances, data and corresponding communications may be thread-generated. An IP layer may be implemented on the endpoint device 405 in the form of IP services 245a, supported on the IoT device. A gateway may likewise include an application layer in the form of higher layers of a router and/or gateway and other example applications (collectively 435) and IP services 245b supported by the gateway. IP services 245a hosted by an IoT endpoint may support a different set of services than the IP services 245b of the gateway, in some cases. In some cases, where the IP services of the endpoint overlap with those of the gateway, these IP services may be applied to communications sent between the endpoint and gateway. In some instances, a particular IP service provided by only one of the IoT endpoint or gateway may nonetheless allow the service to be applied to communications (e.g., as other downstream devices (e.g., an original sender or ultimate destination) in the IoT system may be also support the IP service), among other examples.

In FIG. 4, each of the IoT endpoint device and the gateway stacks (e.g., 405 and 410) may each include enhanced data link layer logic, in this example, an enhanced AX.25 protocol stack (e.g., 315, 440). A modem (e.g., 415, 445) may also be provided as a packet engine for modulating and demodulating the byte that are sent and received. The PHY layer of the endpoint IoT devices and gateways may include logic to support one or more specific LPWA modulation schemes, such as FSK, GMSK, LoRa, LPWA, etc.

The data link layer (e.g., 315, 440) may be modified to generate and interpret data link layer frames of a modified size, such that the frames may be encapsulated within PHY layer frames. The capacity of the PHY layer frame (and thus the size of the modified data link layer frames) may be modulation scheme dependent, with some protocols' PHY layer frames permitting the encapsulation of larger data link layer frames. Additionally, in some implementations, PHY layer frame sizes may be tuned to and sized to comply with governmental radio communication regulations, thereby also affecting the size limits of the data link layer frames, which may be encapsulated in the PHY layer frames. As an example, in the European Union, using the 868 MHz band, a payload size may be configured to respect the duty cycle and power limitations of each sub-band (e.g., 10% @27 dBm, 1% @14 dBm, or 0.1% @14 dBm), while in the 433 MHz band there is no duty cycle but the radio transceiver is to be limited to 25 KHz bandwidth with 20 dBm max output power. As another example, in North America, in order to be compliant with Federal Communications Commission (FCC) regulations, the max output power may be 30 dBm and the time-on-air 400 ms, thereby resulting in a potentially different PHY layer frame and modified data link layer frame sizes. Indeed, in some implementations, an enhanced data link layer logic block of an IoT device or gateway may be programmable or otherwise configurable (e.g., based on global positioning data identifying a location of the device and the relevant radio communication standards) to select a particular regulations-compliant PHY layer frame format and a modified data link layer frame size suitable to the selected PHY layer frame. In one example, a size of a particular one of the fields of the modified data link layer frame (e.g., serving as the payload field for the encapsulation of IP datagram data) may be dynamically adjusted to tune the size of the modified data link layer frame to the size of the PHY layer frame (e.g., and potentially other considerations, such as maintenance of a constant protocol overhead (e.g., of 20 Bytes)), among other examples.

Turning to FIG. 5, a representation 500 of an example format of modified data link layer frame is illustrated. In this particular example, an enhanced AX.25 protocol stack is adopted for the data link layer of a LPWA-enabled IoT device. The modified AX.25 frame may include a 1 byte Flag field, and a 128 bit AX.25 Transfer Frame Header including a 7 byte Destination Address field, a 7 byte Source Address field, a 1 byte Control field, and a 1 byte Protocol Identifier (PI) field. The modified AX.25 frame may further include a modified Information Field whose size is reduced to facilitate an overall reduction in the size of the AX.25 frame to permit its encapsulation in a non-IP-compliant LPWA protocol. In one example, the Information Field may be reduced to a size of less than 236 bytes (although other sizes may be utilized in other examples). Indeed, as noted above, in some implementations, the size of the Information Field of the modified AX.25 frame may be configurable based on the LPWA PHY layer frames used. Continuing with the example of FIG. 5, an example modified AX.25 frame may additionally include a 2 byte Frame-Check Sequence field and conclude with another 1 byte Flag field. It should be understood that other low frequency (i.e., low bitrate or data rate), radio data link layer protocols (i.e., other than AX.25) may also or alternatively be utilized and modified for encapsulation in PHY layer frames of similarly low bitrate LPWA protocols which do not natively support IP traffic.

Figure 6:
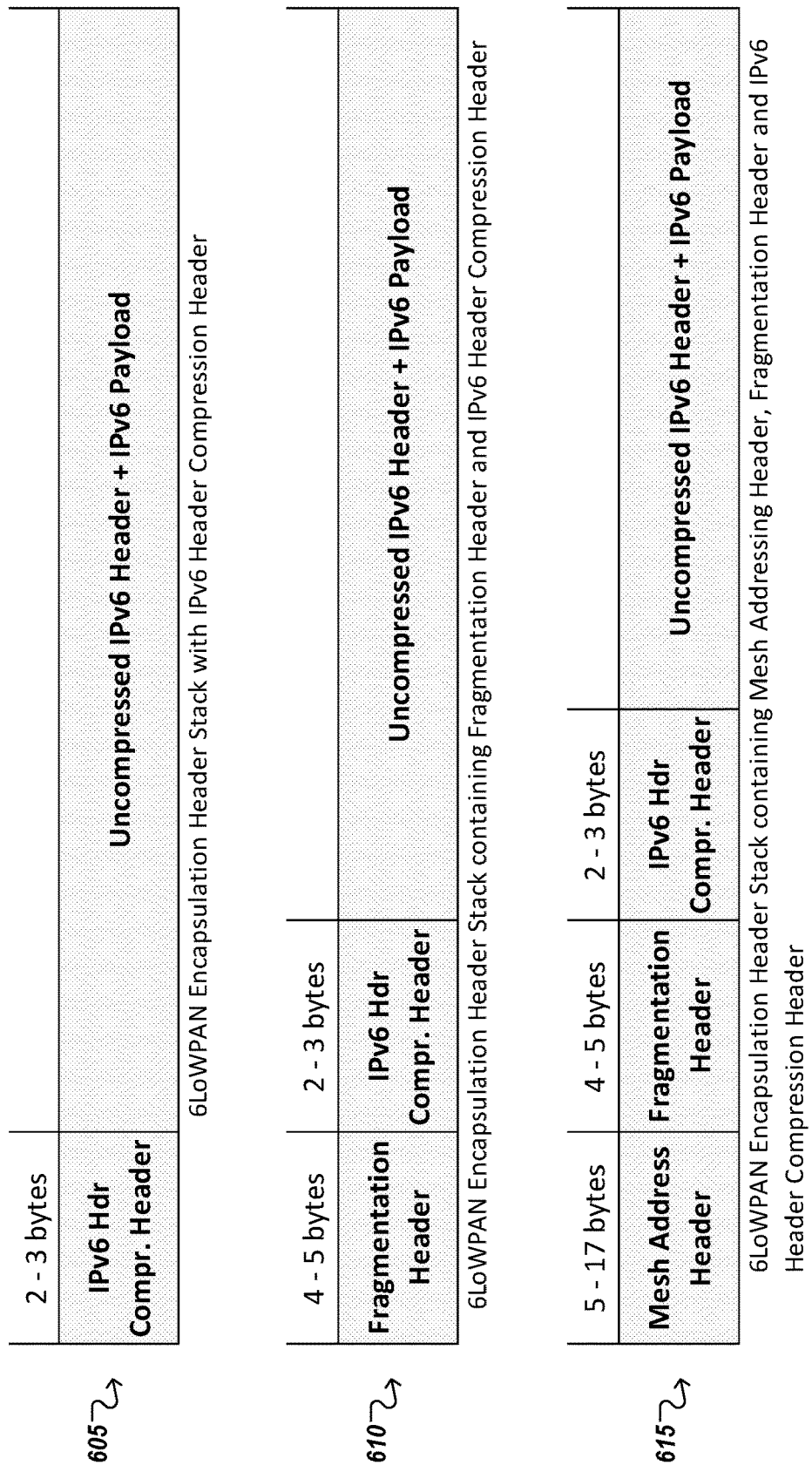
FIG. 6 is a representation of encapsulation of an Internet Protocol (IP)-based packet in an example data link layer frame.

A modified data link layer frame may include a field designated for use in serving as payload for IP datagram data. In the example of FIG. 5, the modified Information Field may be utilized for IP datagram payloads. In the specific example of FIG. 5, the size of the modified Information Field may both facilitate reduction of the overall data link layer frame size while also permitting native IPv4 packets and packet headers to be encapsulated in the modified Information Field and carried over an LPWA channel using the enhanced LPWA capabilities of the IoT device (and/or gateway). In the case of IPv6, compression techniques may be utilized to accommodate IPv6 datagrams in the modified Information Field payload. For instance, as shown in the example of FIG. 6, an IP compression technique, such as 6LowPAN, may be utilized to encapsulate IPv6 data within the payload of the modified Information Field. For instance, as shown at 605, the modified Information Field may be encoded with an IPv6 Header Compression Header and additional IP header and payload data. As shown at 610, the modified Information Field may also or alternatively be encoded with 6LowPAN Fragmentation Header and an IPv6 Header Compression Header, or, at 615, encoded with Mesh Addressing Header, Fragmentation Header, and IPv6 Header Compression Header, etc. In other implementations, other compression techniques may be applied to allow IP data to be encapsulated in constrained payload fields of modified data link layer frames. For instance, micro IP (IIP) or lightweight IP (IwIP) datagrams may be utilized and encapsulated in payload fields (e.g., a modified Information Field) of a modified data link layer frame, thereby allowing full-scale TCP. Such examples may be utilized, for instance, in embedded systems with tens of kilobytes of free RAM and room for around 40 kilobytes of code ROM, among other examples.

Data generated by software or firmware threads or by applications running on a device may be encapsulated and sent as IP datagrams, thereby allowing IP-based services to be applied to the data transmission. The IP datagrams, as discussed above, may in some cases be sent as fragments over multiple LPWA PHY layer frames (and corresponding modified data link layer frame wrappers). Fragmentation headers and other IP information encapsulated in the modified Information Fields of the data link layer frames may be then used (either at an IoT endpoint device or another destination endpoint) to reassemble the IP data and files encapsulated in the IP datagram payloads as well as apply any IP-based services applied to the communication.

While some of the systems and solutions described and illustrated herein have been described as containing or being associated with various elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may added or may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Figure 7:
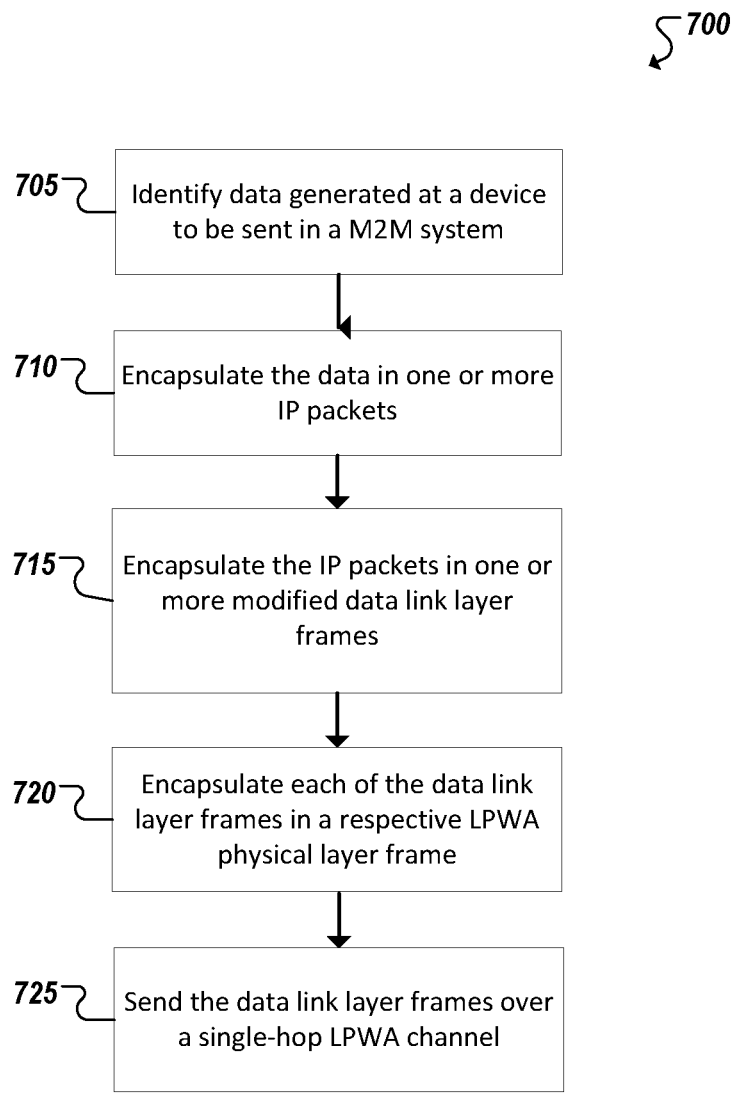
FIG. 7 is a flowchart illustrating an example technique for encapsulating an Internet Protocol (IP)-based packet in an example data link layer frame.

FIG. 7 is a simplified flowcharts 700 illustrating an example technique for carrying IP traffic over LPWA communication channels. In one example, data may be identified 705 (e.g., generated by an application or a thread executing on a device) that is to be communicated to another device or system in an M2M network. The data may be packaged or encapsulated 710 in one or more IP datagrams. One or more IP-based services may be applied to the packaged data. The IP packets may then be encapsulated 715 in one or more modified data link layer frames, such as shortened AX.25 frames. In some cases, multiple AX.25 frames may be used to send fragments of a single IP packet. Each of the modified data link layer frames may then be encapsulated 720 in a respective LPWA physical layer frame for sending 725 over an LPWA radio channel.

In some cases, the LPWA physical layer (PHY) frame wraps the modified data link layer frame and encapsulating IP data and the LPWA PHY frame may be sent to another LPWA endpoint or to a gateway, enabling the LPWA frame to be translated into a frame or datagram of another communications technology (e.g., Bluetooth, WiFi, Ethernet, Zigbee, etc.). An LPWA-enable endpoint may likewise receive an LPWA PHY frame, unpack the modified data link layer frame, and access the encapsulated IP data to provide end-to-end IP services to the data and deliver the data to an IP layer, application layer, or other higher layer of its stack to operate upon the received data. Data encapsulated in the IP datagrams and carried over an LPWA channel may embody runtime data describing sensor values, instructions (e.g., to trigger one or more device actuators or cause one or more operations to be performed by the receiving device), or other runtime data. In other cases, the IP data payload may include data used during discovery, authentication, configuration, or other pre-deployment/pre-runtime actions and communications (e.g., involving an IoT management system) of an IoT or other M2M system. LPWA networks and the enhanced data link layer of implementations discussed above may, in some cases, be characterized by low power, low frequency, and long channel hop distances (e.g., to support battery-powered IoT devices designed to live multiple years (e.g., 10+) on battery power, etc.).

Figure 8:
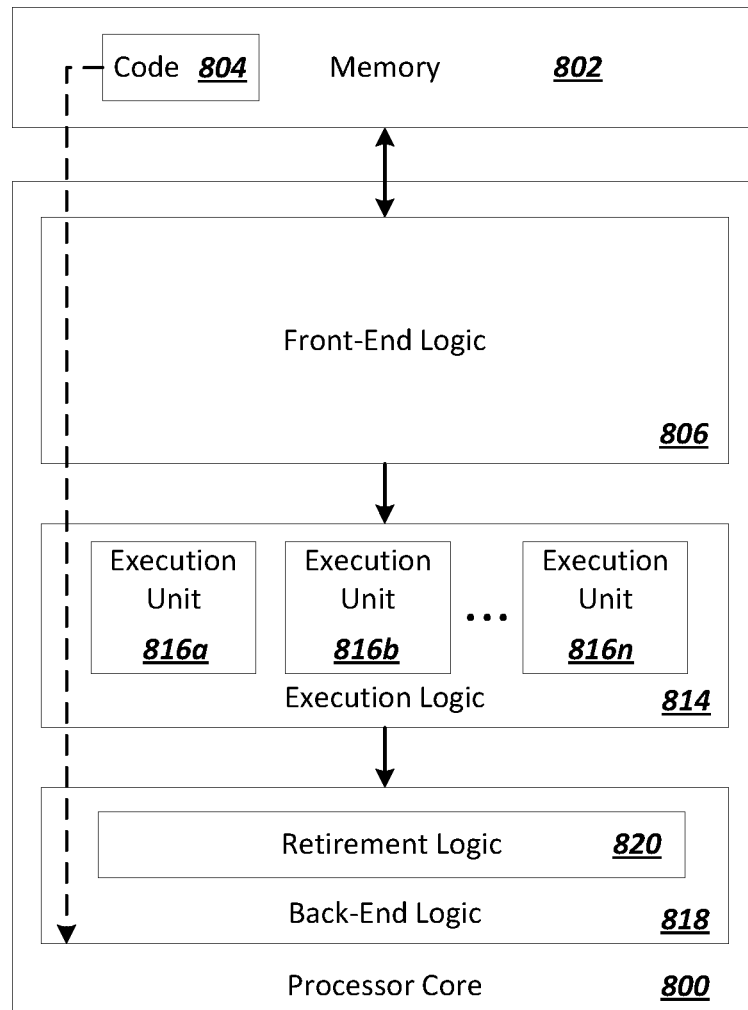
FIG. 8 is a block diagram of an exemplary processor in accordance with one embodiment.
Figure 9:
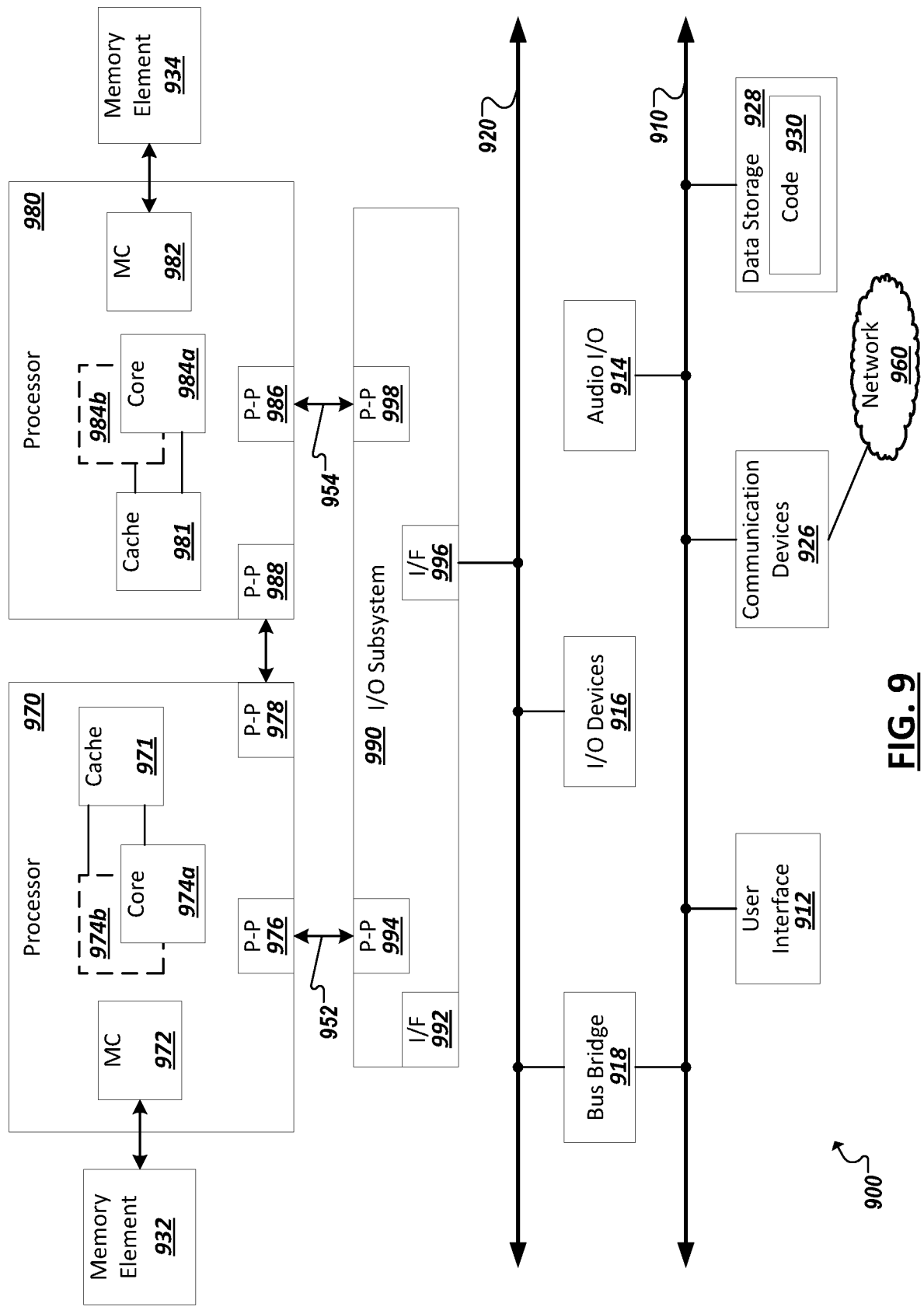
FIG. 9 is a block diagram of an exemplary computing system in accordance with one embodiment.

FIGS. 8-9 are block diagrams of exemplary computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 8-9.

FIG. 8 is an example illustration of a processor according to an embodiment. Processor 800 is an example of a type of hardware device that can be used in connection with the implementations above. Processor 800 may be any type of processor, such as a microprocessor, an embedded processor, a digital signal processor (DSP), a network processor, a multi-core processor, a single core processor, or other device to execute code. Although only one processor 800 is illustrated in FIG. 8, a processing element may alternatively include more than one of processor 800 illustrated in FIG. 8. Processor 800 may be a single-threaded core or, for at least one embodiment, the processor 800 may be multi-threaded in that it may include more than one hardware thread context (or "logical processor") per core.

FIG. 8 also illustrates a memory 802 coupled to processor 800 in accordance with an embodiment. Memory 802 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 800 can execute any type of instructions associated with algorithms, processes, or operations detailed herein. Generally, processor 800 can transform an element or an article (e.g., data) from one state or thing to another state or thing.

Code 804, which may be one or more instructions to be executed by processor 800, may be stored in memory 802, or may be stored in software, hardware, firmware, or any suitable combination thereof, or in any other internal or external component, device, element, or object where appropriate and based on particular needs. In one example, processor 800 can follow a program sequence of instructions indicated by code 804. Each instruction enters a front-end logic 806 and is processed by one or more decoders 808. The decoder may generate, as its output, a micro operation such as a fixed width micro operation in a predefined format, or may generate other instructions, microinstructions, or control signals that reflect the original code instruction. Front-end logic 806 also includes register renaming logic 810 and scheduling logic 812, which generally allocate resources and queue the operation corresponding to the instruction for execution.

Processor 800 can also include execution logic 814 having a set of execution units 816a, 816b, 816n, etc. Some embodiments may include a number of execution units dedicated to specific functions or sets of functions. Other embodiments may include only one execution unit or one execution unit that can perform a particular function. Execution logic 814 performs the operations specified by code instructions.

After completion of execution of the operations specified by the code instructions, back-end logic 818 can retire the instructions of code 804. In one embodiment, processor 800 allows out of order execution but requires in order retirement of instructions. Retirement logic 820 may take a variety of known forms (e.g., re-order buffers or the like). In this manner, processor 800 is transformed during execution of code 804, at least in terms of the output generated by the decoder, hardware registers and tables utilized by register renaming logic 810, and any registers (not shown) modified by execution logic 814.

Although not shown in FIG. 8, a processing element may include other elements on a chip with processor 800. For example, a processing element may include memory control logic along with processor 800. The processing element may include I/O control logic and/or may include I/O control logic integrated with memory control logic. The processing element may also include one or more caches. In some embodiments, non-volatile memory (such as flash memory or fuses) may also be included on the chip with processor 800.

FIG. 9 illustrates a computing system 900 that is arranged in a point-to-point (PtP) configuration according to an embodiment. In particular, FIG. 9 shows a system where processors, memory, and input/output devices are interconnected by a number of point-to-point interfaces. Generally, one or more of the computing systems described herein may be configured in the same or similar manner as computing system 900.

Processors 970 and 980 may also each include integrated memory controller logic (MC) 972 and 982 to communicate with memory elements 932 and 934. In alternative embodiments, memory controller logic 972 and 982 may be discrete logic separate from processors 970 and 980. Memory elements 932 and/or 934 may store various data to be used by processors 970 and 980 in achieving operations and functionality outlined herein.

Processors 970 and 980 may be any type of processor, such as those discussed in connection with other figures. Processors 970 and 980 may exchange data via a point-to-point (PtP) interface 950 using point-to-point interface circuits 978 and 988, respectively. Processors 970 and 980 may each exchange data with a chipset 990 via individual point-to-point interfaces 952 and 954 using point-to-point interface circuits 976, 986, 994, and 998. Chipset 990 may also exchange data with a high-performance graphics circuit 938 via a high-performance graphics interface 939, using an interface circuit 992, which could be a PtP interface circuit. In alternative embodiments, any or all of the PtP links illustrated in FIG. 9 could be implemented as a multi-drop bus rather than a PtP link.

Chipset 990 may be in communication with a bus 920 via an interface circuit 996. Bus 920 may have one or more devices that communicate over it, such as a bus bridge 918 and I/O devices 916. Via a bus 910, bus bridge 918 may be in communication with other devices such as a user interface 912 (such as a keyboard, mouse, touchscreen, or other input devices), communication devices 926 (such as modems, network interface devices, or other types of communication devices that may communicate through a computer network 960), audio I/O devices 914, and/or a data storage device 928. Data storage device 928 may store code 930, which may be executed by processors 970 and/or 980. In alternative embodiments, any portions of the bus architectures could be implemented with one or more PtP links.

The computer system depicted in FIG. 9 is a schematic illustration of an embodiment of a computing system that may be utilized to implement various embodiments discussed herein. It will be appreciated that various components of the system depicted in FIG. 9 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

In general, one aspect of the subject matter described in this specification can be embodied in methods and executed instructions that include or cause the actions of identifying a sample that includes software code, generating a control flow graph for each of a plurality of functions included in the sample, and identifying, in each of the functions, features corresponding to instances of a set of control flow fragment types. The identified features can be used to generate a feature set for the sample from the identified features These and other embodiments can each optionally include one or more of the following features. The features identified for each of the functions can be combined to generate a consolidated string for the sample and the feature set can be generated from the consolidated string. A string can be generated for each of the functions, each string describing the respective features identified for the function. Combining the features can include identifying a call in a particular one of the plurality of functions to another one of the plurality of functions and replacing a portion of the string of the particular function referencing the other function with contents of the string of the other function. Identifying the features can include abstracting each of the strings of the functions such that only features of the set of control flow fragment types are described in the strings. The set of control flow fragment types can include memory accesses by the function and function calls by the function. Identifying the features can include identifying instances of memory accesses by each of the functions and identifying instances of function calls by each of the functions. The feature set can identify each of the features identified for each of the functions. The feature set can be an n-graph.

Further, these and other embodiments can each optionally include one or more of the following features. The feature set can be provided for use in classifying the sample. For instance, classifying the sample can include clustering the sample with other samples based on corresponding features of the samples. Classifying the sample can further include determining a set of features relevant to a cluster of samples. Classifying the sample can also include determining whether to classify the sample as malware and/or determining whether the sample is likely one of one or more families of malware. Identifying the features can include abstracting each of the control flow graphs such that only features of the set of control flow fragment types are described in the control flow graphs. A plurality of samples can be received, including the sample. In some cases, the plurality of samples can be received from a plurality of sources. The feature set can identify a subset of features identified in the control flow graphs of the functions of the sample. The subset of features can correspond to memory accesses and function calls in the sample code.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. One or more embodiments may provide a device or other apparatus that includes a microcontroller and communications logic to identify data to be sent to another device and encapsulate the data in a data link layer frame of a wireless data link layer protocol. The data link layer frame includes a particular field and the particular field encapsulates Internet Protocol (IP) packet data, and the data is encapsulated in the IP packet data. The device further includes a transmitter to send the data to the other device over a one-hop radio link according to a low power wide area (LPWA) protocol, and the data link layer frame is sent in a physical layer frame of the LPWA protocol.

In one example, the communications logic includes data link layer logic is based on a defined data link layer protocol, the data link layer logic is to generate the data link layer frame and the data link layer frame has a format different from a frame format of the defined data link protocol.

In one example, the data link layer frame is shorter than frames defined according to the frame format of the defined data link protocol.

In one example, length of the data link layer frame is based on a length of the physical layer frame.

In one example, the length of the physical layer frame is based on compliance with one or more radio communication regulations.

In one example, the data link layer protocol includes AX.25, the frame format includes a native AX.25 frame format, and the format of the data link layer frame is different from the native AX.25 frame format.

In one example, the data link layer frame includes a shortened information field.

In one example, the native AX.25 frame format defines an information field of 256 bytes and shortened information field is fewer than 236 bytes.

In one example, the IP packet data includes IPv4 data.

In one example, the IP packet data includes IPv6 data.

In one example, the IPv6 data includes compressed IPv6 packet data.

In one example, the LPWA protocol does not natively support IP traffic.

In one example, the communications logic is further to apply one or more IP-based services to communication of the data.

In one example, the one or more IP-based services include one or more of Constrained Application Protocol (CoAP), Message Queuing Telemetry Transport (MQTT), Trivial File Transport Protocol (TFTP), and Secure Shell cryptography (SSH).

In one example, the wireless data link layer includes an AX.25-based protocol

In one example, the single hop covers a distance of at least 10 kilometers.

One or more embodiments may provide a method, a system, a machine readable storage medium with executable code to identify data to be sent in a machine-to-machine network, encapsulate the data in a particular Internet Protocol (IP) packet, encapsulate the particular IP packet in a payload field of one or more frames of a particular wireless data link layer protocol, where each of the data link layer frames includes a shortened version of a particular data link layer frame format defined by the particular wireless data link layer protocol. Each of the one or more data link layer frames are encapsulated in a respective physical layer frame of a low power wide area (LPWA) protocol. The physical layer frames with the data are sent over a wide area, single hop radio link associated with the LPWA protocol.

In one example, the particular wireless data link layer protocol includes AX.25, the payload field includes an information field, and the shortened version of the particular data link layer frame format includes a shorted version of the information field.

One or more embodiments may provide a gateway device that include at least one processor, memory, a receiver to receive data from one or more devices in an machine-to-machine network, and a communications module. The communications module may include low power wide area (LPWA) physical layer logic to extract particular data link layer frames from physical layer frames received over an LPWA channel, where the particular data link layer frames are according to a particular format including a shortened version of a frame format defined for a particular data link layer protocol, data link layer logic to interpret and generate the particular data link layer frames, where the particular data link layer frames each include a payload field to encapsulate internet protocol (IP) data, and IP layer logic to process the IP data encapsulated in the particular data link layer frames.

In one example, the IP layer logic is further to apply one or more IP-based services to the IP data.

In one example, the communications module is further to translate data received over LPWA channels into data of another network protocol and forward the translated data to another device using a channel according to the other network protocol.

In one example, the communications module is further to translate data received over the network protocol into LPWA physical layer frames encapsulating instances of the particular data link layer frames and send the LPWA physical layer frames to one or more devices over LPWA channels.

One or more embodiments may provide a system including one or more devices including at least one particular device, where the particular device includes a low power wide area (LPWA) module including Internet Protocol (IP) logic to generate IP data to encapsulate data generated by the particular device, data link layer logic to generate a data link layer frame according to a shortened version of a frame format defined for a particular data link layer protocol, where at least a portion of the IP data is to be encapsulated in the data link layer frame, and LPWA physical layer logic to generate a physical layer frame to encapsulate the data link layer frame. The particular device further includes a transceiver to transmit the physical layer frame with the data over a LPWA wireless channel.

In one example, the one or more devices include two or more endpoint devices in a machine-to-machine (M2M) network and a gateway device, where the particular device includes one of the two or more endpoint devices, and the gateway device includes data link layer logic to interpret data link layer frames according to the shortened version of the frame format, and the gateway device is further to receive the physical layer frame over the LPWA channel, translate the physical layer frame into translated data configured for transmission using a non-LPWA communication technology, and route the translated data to another device using a channel according to the non-LPWA communication technology.

In one example, the particular device includes a gateway to route data to a plurality of endpoint devices using LPWA wireless channels Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

The invention claimed is:

1. An apparatus comprising:
a microcontroller; and
communications logic to:
identify data to be sent to another device; and
encapsulate the data in a data link layer frame, wherein the data link layer frame comprises a particular field and the particular field encapsulates Internet Protocol (IP) packet data, and the data is encapsulated in the IP packet data, wherein the data link layer frame is according to an AX.25 protocol; and
a transmitter to send the data to the other device over a wireless link, wherein the wireless link comprises a one-hop radio link according to a low power wide area (LPWA) protocol, and the data link layer frame is sent in a physical layer frame of the LPWA protocol, wherein the communications logic comprises data link layer logic to implement a defined data link layer protocol, the data link layer logic is to generate the data link layer frame, and the data link layer frame has a format different from a frame format of the defined data link protocol, wherein the data link layer frame is shorter than frames defined according to the frame format of the defined data link protocol, and the length of the data link layer frame is based on a length of the physical layer frame.

2. The apparatus of claim 1, wherein the length of the physical layer frame is based on compliance with one or more radio communication regulations.

3. The apparatus of claim 2, wherein the data link layer protocol comprises AX.25, the frame format comprises a native AX.25 frame format, and the format of the data link layer frame is different from the native AX.25 frame format.

4. The apparatus of claim 3, wherein the data link layer frame comprises a shortened information field.

5. The apparatus of claim 3, wherein the native AX.25 frame format defines an information field of 256 bytes and shortened information field comprises fewer than 236 bytes.

6. The apparatus of claim 1, wherein the IP packet data comprises IPv4 data.

7. The apparatus of claim 1, wherein the IP packet data comprises IPv6 data.

8. The apparatus of claim 7, wherein the IPv6 data comprises compressed IPv6 packet data.

9. The apparatus of claim 1, wherein the LPWA protocol does not natively support IP traffic.

10. The apparatus of claim 1, wherein the communications logic is further to apply one or more IP-based services to communication of the data.

11. The apparatus of claim 10, wherein the one or more IP-based services comprise one or more of Constrained Application Protocol (CoAP), Message Queuing Telemetry Transport (MATT), Trivial File Transport Protocol (TFTP), and Secure Shell cryptography (SSH).

12. The apparatus of claim 1, wherein the wireless data link layer comprises an AX.25-based protocol.

13. The apparatus of claim 1, wherein the single hop covers a distance of at least 10 kilometers.

14. At least one non-transitory machine accessible storage medium having code stored thereon, wherein the code, when executed on a machine, causes the machine to:
identify data to be sent in a machine-to-machine network;
encapsulate the data in a particular Internet Protocol (IP) packet;
encapsulate the particular IP packet in a payload field of one or more frames of a particular wireless data link layer protocol, wherein the particular wireless data link layer protocol comprises an AX.25 protocol, the data link layer frame has a format different from a frame format of the particular wireless data link protocol, wherein the data link layer frame is shorter than frames defined according to the frame format of the particular wireless data link protocol;
encapsulate each of the one or more data link layer frames in a respective physical layer frame of a low power wide area (LPWA) protocol, wherein the length of the data link layer frame is based on a length of the physical layer frame; and send the physical layer frames with the data over a wide area, single hop radio link associated with the LPWA protocol.

15. A system comprising:
one or more devices comprising at least one particular device, wherein the particular device comprises a low power wide area (LPWA) module comprising:
  Internet Protocol (IP) logic to generate IP data to encapsulate data generated by the particular device;
  data link layer logic to implement a defined data link layer protocol, wherein the data link layer logic is to generate a data link layer frame, wherein at least a portion of the IP data is to be encapsulated in the data link layer frame, the data link layer frame has a format different from a frame format of the defined data link protocol, wherein the data link layer frame is shorter than frames defined according to the frame format of the defined data link protocol; and
  LPWA physical layer logic to generate a physical layer frame to encapsulate the data link layer frame, wherein the length of the data link layer frame is based on a length of the physical layer frame;
  wherein the particular device further comprises a transceiver to transmit the physical layer frame with the data over a LPWA wireless channel.

16. The system of claim 15, wherein the one or more devices comprise two or more endpoint devices in a machine-to-machine (M2M) network and a gateway device, wherein the particular device comprises one of the two or more endpoint devices, and the gateway device comprises data link layer logic to interpret data link layer frames according to the shortened version of the frame format, and the gateway device is further to receive the physical layer frame over the LPWA channel, translate the physical layer frame into translated data configured for transmission using a non-LPWA communication technology, and route the translated data to another device using a channel according to the non-LPWA communication technology.

17. The system of claim 15, wherein the particular device comprises a gateway to route data to a plurality of endpoint devices using LPWA wireless channels.

* * * * *